United States Patent
Landes

(10) Patent No.: US 10,138,603 B2
(45) Date of Patent: Nov. 27, 2018

(54) AUTONOMOUS BALLAST UNLOADING CONSIST

(71) Applicant: Herzog Railroad Services, Inc., St. Joseph, MO (US)

(72) Inventor: Nathan A. Landes, St. Joseph, MO (US)

(73) Assignee: Herzog Railroad Services, Inc., St. Joseph, MO (US)

( * ) Notice: Subject to any disclaimer, the term of this patent is extended or adjusted under 35 U.S.C. 154(b) by 0 days.

(21) Appl. No.: 15/270,912

(22) Filed: Sep. 20, 2016

(65) Prior Publication Data

US 2017/0096778 A1 Apr. 6, 2017

Related U.S. Application Data

(60) Provisional application No. 62/235,859, filed on Oct. 1, 2015.

(51) Int. Cl.
*E01B 27/02* (2006.01)
*B61L 25/02* (2006.01)
(Continued)

(52) U.S. Cl.
CPC .............. *E01B 27/022* (2013.01); *B61D 7/02* (2013.01); *B61D 7/32* (2013.01); *B61L 15/0081* (2013.01);
(Continued)

(58) Field of Classification Search
CPC ........ E01B 27/02; E01B 27/022; E01B 37/00; E01B 2203/06; G08G 1/207;
(Continued)

(56) References Cited

U.S. PATENT DOCUMENTS 5,129,605 A * 7/1992 Burns ................... B61L 25/021
                                                246/122 R
5,284,097 A * 2/1994 Peppin ................... E01B 27/02
                                                104/88.02
(Continued)

FOREIGN PATENT DOCUMENTS

JP    2000329839 A  * 11/2000
JP    2003294825 A  * 10/2003

OTHER PUBLICATIONS

Extended European search report dated Feb. 1, 2017 in corresponding European patent application No. 16190277.0.

*Primary Examiner* — Behrang Badii
*Assistant Examiner* — David A Testardi
(74) *Attorney, Agent, or Firm* — ERICKSON KERNELL IP, LLC; Kent R. Erickson

(57) ABSTRACT

An autonomous ballast consist for unloading ballast along a railway and methods for unloading ballast thereby. The consist includes a plurality of ballast cars and at least one control car. The control car includes a controller, a navigation system, and electric, hydraulic, or pneumatic generators that power the hopper cars. The controller employs the navigation system to determine the location of the consist relative to a track survey indicating locations and amounts of ballast to be unloaded. The controller instructs the hopper cars to open/close ballast doors to dump appropriate amounts of ballast in desired locations. The controller also monitors the status of the hopper cars and the accuracy of the navigation system to automatically adjust the operational state of the consist relative thereto. The unloading operation is carried out automatically, without need for operator intervention, and without risk of damage to railroad facilities.

21 Claims, 15 Drawing Sheets

(51) Int. Cl.
  *B61L 15/00* (2006.01)
  *B61D 7/32* (2006.01)
  *B61D 7/02* (2006.01)

(52) U.S. Cl.
  CPC ............ *B61L 25/025* (2013.01); *E01B 27/02* (2013.01); *B61L 2205/04* (2013.01); *E01B 2203/06* (2013.01); *G05D 2201/0202* (2013.01); *Y02T 30/30* (2013.01)

(58) Field of Classification Search
  CPC .... B61L 15/0081; B61L 25/02; B61L 25/025; B61L 25/028; B61L 2205/04; B65G 47/46; B61D 7/24; B61D 7/28; G05D 2201/0202; G01S 5/0263; G01S 19/50
  See application file for complete search history.

(56) References Cited

U.S. PATENT DOCUMENTS

| | | | |
|---|---|---|---|
| 5,311,822 A | 5/1994 | Bounds | |
| 5,359,942 A * | 11/1994 | Ward | B61D 7/30 105/240 |
| 5,424,957 A * | 6/1995 | Kerkhoff | A01K 5/02 119/51.02 |
| 6,057,779 A * | 5/2000 | Bates | G06Q 50/28 340/10.51 |
| 6,421,587 B2 * | 7/2002 | Diana | B61L 25/023 246/122 R |
| 6,456,937 B1 * | 9/2002 | Doner | B61L 15/0027 246/122 R |
| 6,526,339 B1 * | 2/2003 | Herzog | B61L 25/025 105/311.1 |
| 6,704,626 B1 | 3/2004 | Herzog et al. | |
| 7,152,347 B2 | 12/2006 | Herzog et al. | |
| 7,162,327 B1 * | 1/2007 | Crozier | E01B 29/06 700/213 |
| 7,557,748 B1 * | 7/2009 | Zahm | B61L 25/026 342/357.33 |
| 7,707,944 B2 | 5/2010 | Bounds | |
| 2001/0044695 A1 * | 11/2001 | Doner | B61L 15/0027 701/482 |
| 2002/0073882 A1 * | 6/2002 | Howard | B61D 7/32 105/247 |
| 2004/0015275 A1 | 1/2004 | Herzog et al. | |
| 2005/0216142 A1 | 9/2005 | Herzog et al. | |
| 2005/0278982 A1 | 12/2005 | Herzog et al. | |
| 2006/0015233 A1 * | 1/2006 | Olsen, III | G01V 15/00 701/50 |
| 2006/0058957 A1 * | 3/2006 | Hickenlooper | B61L 25/025 701/408 |
| 2006/0271291 A1 * | 11/2006 | Meyer | G01C 21/00 701/408 |
| 2009/0043435 A1 * | 2/2009 | Kane | B61L 25/025 701/19 |
| 2009/0149201 A1 * | 6/2009 | Ryu | G01S 5/0263 455/456.6 |
| 2010/0026551 A1 * | 2/2010 | Szwilski | B61K 9/08 342/22 |
| 2010/0312461 A1 * | 12/2010 | Haynie | B61L 25/025 701/117 |
| 2011/0025481 A1 * | 2/2011 | Gaydos | B61D 7/28 340/431 |
| 2012/0222579 A1 * | 9/2012 | Turner | E01B 27/022 104/2 |
| 2013/0096739 A1 * | 4/2013 | Landes | E01B 27/02 701/19 |
| 2013/0138314 A1 * | 5/2013 | Viittala | B61L 15/0027 701/70 |
| 2013/0335268 A1 * | 12/2013 | Enge | G01S 19/22 342/357.61 |
| 2014/0297069 A1 * | 10/2014 | Landes | E01B 27/02 701/19 |
| 2014/0343835 A1 * | 11/2014 | Cooper | B61L 23/00 701/300 |
| 2015/0057851 A1 * | 2/2015 | Turner | E01B 27/022 701/19 |

\* cited by examiner

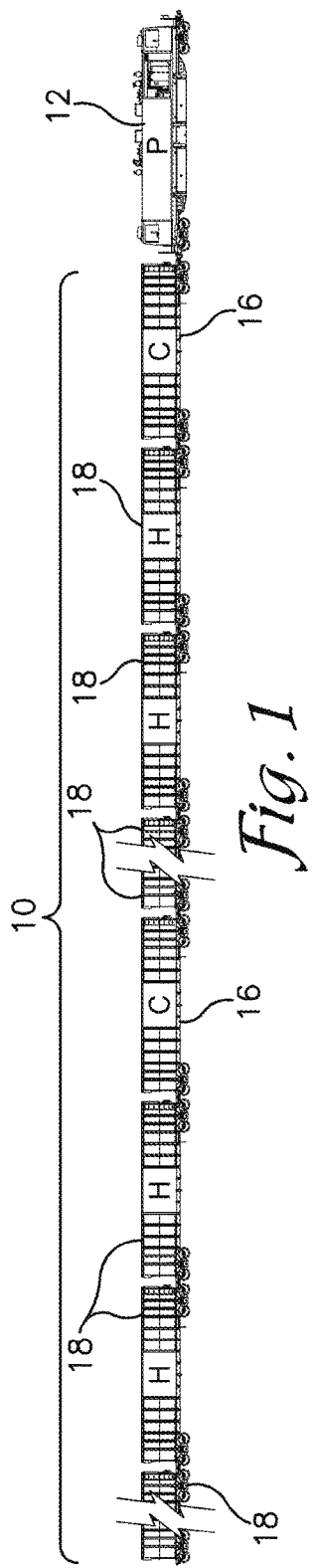
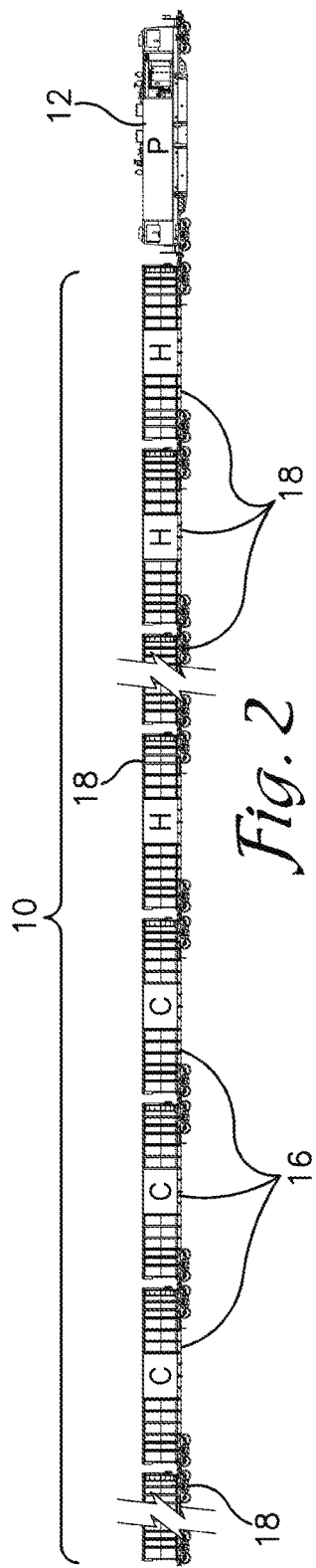
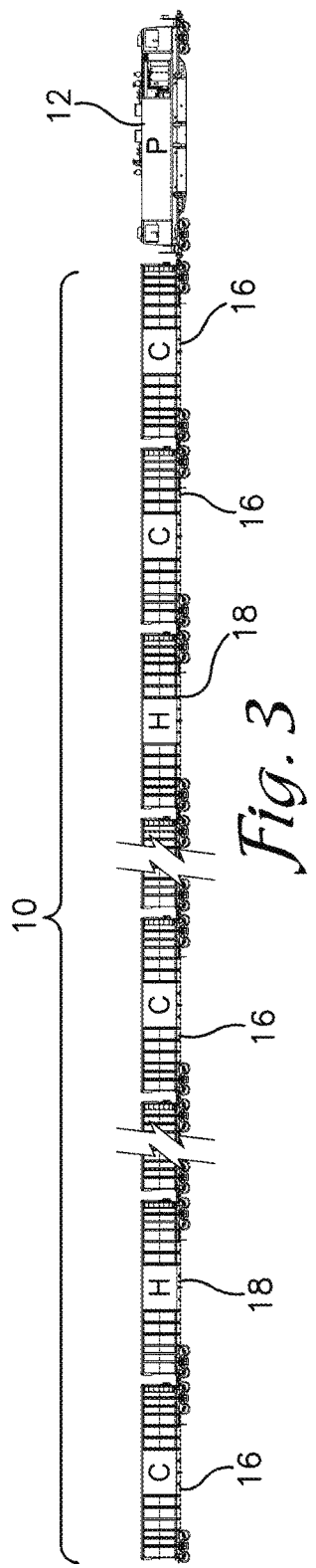

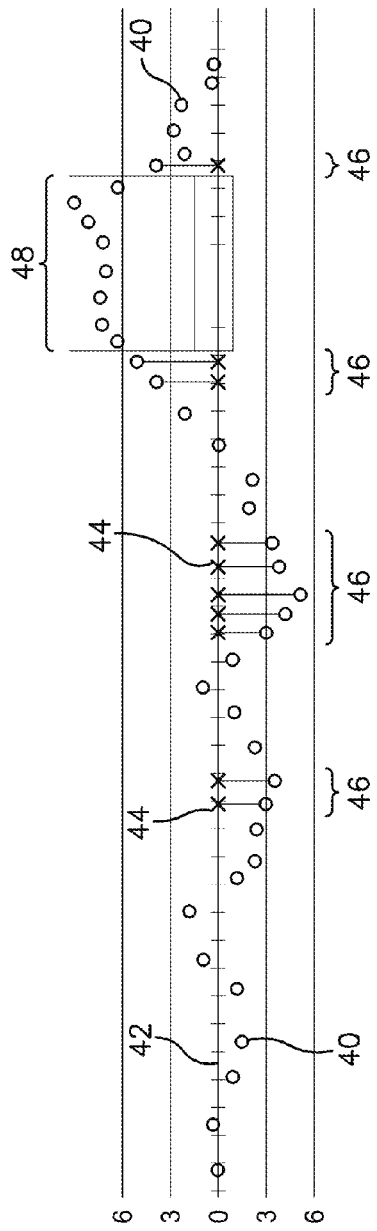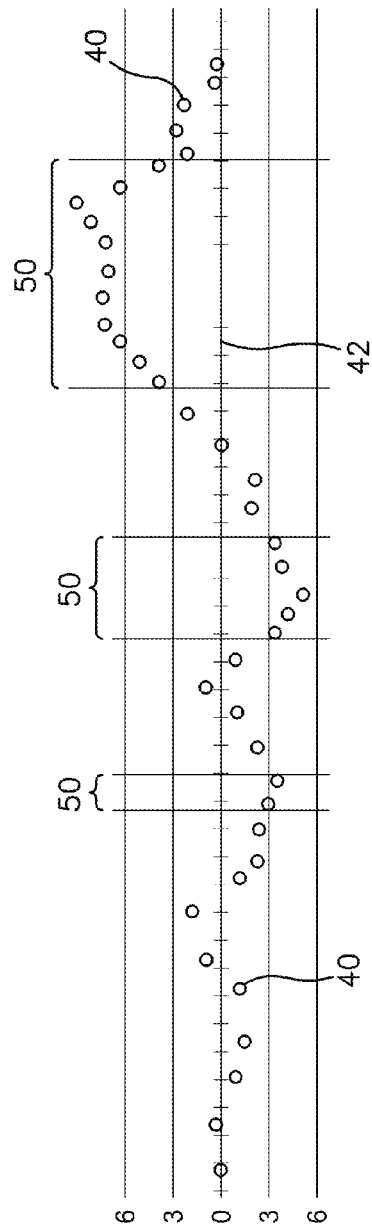

AUTONOMOUS BALLAST UNLOADING CONSIST

CROSS-REFERENCE TO RELATED APPLICATIONS

This application claims the benefit of U.S. Provisional Patent Application No. 62/235,859, filed Oct. 1, 2015 the disclosure of which is hereby incorporated herein in its entirety by reference.

BACKGROUND

Conventional railroads in the United States and elsewhere are typically formed by a compacted sub-grade, a bed of gravel ballast, wooden cross-ties positioned upon and within the ballast, and parallel steel rails secured to the ties. Variations of construction occur at road and bridge crossings and in other circumstances. The ballast beneath and between the ties stabilizes the positions of the ties, keeps the rails level, and provides some cushioning of the composite structure for loads imposed by rail traffic. Vibrations from the movement of tracked vehicles over the rails and weathering from wind, rain, ice, and freeze and thaw cycles can all contribute to dislodging of some of the ballast over time. Thus, in addition to other maintenance activities, it is necessary to replace ballast periodically to maintain the integrity and safety of railroads.

Ballast has been spread in the past using specially designed ballast hopper cars that include a hopper structure holding a quantity of ballast, a ballast chute communicating with the hopper, and a power operated ballast discharge door in the chute. The door can be controlled to selectively open or close to control the discharge of ballast. In some designs, the discharge door can be controlled to open outboard toward the outside of the rails, to close, or to open inboard toward the inside between the rails. Typical ballast hopper cars have a front hopper and a rear hopper, and each hopper has two transversely spaced doors, one to the left and one to the right. Thus, each hopper door can be controlled to discharge ballast outside the rails on the left and/or the right or between the rails. A typical configuration of a ballast hopper car is described in more detail in U.S. Pat. No. 5,657,700, which is incorporated herein by reference.

Ballast spreading has most often been controlled manually in cooperation with human spotters who walk alongside the moving ballast cars to open or close the ballast doors as necessary. A more recent ballast spreading control technique is by the use of a radio-linked controller carried by an operator who walks alongside the moving ballast cars. Both conventional control methods are slow and thus disruptive to normal traffic on the railroad section being maintained, thereby causing delays in deliveries and loss of income.

U.S. Pat. No. 6,526,339 to Herzog, et al. generally discloses methods for spreading railroad ballast with location control based on data received from a global positioning system (GPS). The GPS system is a "constellation" of satellites traveling in orbits which distribute them around the earth, transmitting location and time signals. As originally designed, a GPS receiver, receiving signals from at least four satellites, was able to process the signals and triangulate position coordinates accurate to within about ten to twenty meters. Current generations of commercially available GPS receivers may use additional techniques and/or instrumentation to increase accuracy. For example, differential GPS techniques employ land based stationary reference points to calculate correction factors useable by nearby GPS units. Inertial navigation systems that include one or more motion sensors, such as gyroscopes and accelerometers can also be employed to enhance the precision and accuracy of the location determined by the GPS. Such accuracy is adequate for depositing ballast where desired and inhibiting the deposit of ballast where it is not desired.

Because railroad companies typically maintain hundreds or thousands of miles of track on a recurring schedule, the ballast replacement component of track maintenance alone can be a major undertaking in terms of equipment, materials, traffic control, labor, and management. Current processes for replenishing ballast require operators to be present on the consist and to control when and where the ballast is deposited. Modern developments have automated some aspects of the offloading operations but the operator is still required to be present on the consist and to monitor and/or override the automated processes to ensure that the ballast is deposited in desired quantities, in the desired locations, and without damaging facilities located along the railway.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, an autonomous ballast delivery consist for depositing ballast along a railway without direct oversight by an operator located on the consist.

The consist includes a plurality of hopper cars and at least one control car. The control car includes a master controller configured to communicate with and control one or more gates in each of the hopper cars to thereby control unloading of ballast therefrom and one or more generators to provide power to the hopper cars for operation thereof. The control car also includes a variety of components for determining and tracking the geographic location of the consist, such as global positioning systems (GPS), inertial guidance, wheel encoders, and the like. As such, ballast requirements for a railway can be provided to the master controller which in turn tracks travel of the consist along the railway and controls the hopper car gates to deposit the appropriate amount of ballast in desired locations along the railway as the consist travels therealong.

The location information along with status data received from each of the hopper cars is also used by the master controller to determine operational states of the consist. The master controller can place the consist or one or more individual hopper cars in a full operational state, a wait state, and/or a disengaged state. In the full operational state, the location information and status data are within desired parameters and ballast can be unloaded as needed. When the location information varies outside of the desired parameters or when a fault status is detected in a hopper car, one or more of the hopper cars can be placed in a wait state in which their gates are closed and no ballast is unloaded therefrom until being returned to full operational state by the master controller. If the location information and/or status data fall outside of required ranges or if the ballast has been completely unloaded, the hopper cars can be placed in a disengaged state to await operator intervention either directly or remotely from a control center.

The use of the wait state enables the master controller to retain the consist in an operational state, e.g. not disengaged, to wait until the problem issue clears. The operation can then resume without need for operator intervention. The master controller can thus maintain automatic operation of the consist when the consist is moved off route such as onto a siding, when GPS or other location data degrades, or when fault signals are received from one or more hopper cars. The master controller is further operable to observe safety zones around railway facilities in which dumping is not to occur and to expand those safety zones based on degraded location data.

In one embodiment, one or more of the hopper cars are provided with a positioning system that informs the master controller of the position of the hopper car geographically or relative to the control car, another hopper car, or another reference point. The master controller can thereby account for coupler slack variations between the hopper cars and thus increase the precision of distribution of the ballast along the railway.

In another embodiment, a flow rate of ballast from each of the gates in the hopper cars is monitored by the master controller based on data received from a vibration sensor mounted in association with each respective gate. The amount of ballast deposited can thus be more accurately controlled and recorded by the master controller.

DESCRIPTION OF THE DRAWINGS

Illustrative embodiments of the invention are described in detail below with reference to the attached drawing figures, and wherein:

FIG. 1 is a diagrammatic illustration of a ballast delivery consist depicted in accordance with an embodiment of the invention;

FIG. 2, is a diagrammatic illustration of a ballast delivery consist with a plurality of control cars disposed centrally along the length thereof depicted in accordance with an embodiment of the invention;

FIG. 3 is a diagrammatic illustration of a ballast delivery consist with a control car positioned at a rear end thereof depicted in accordance with an embodiment of the invention;

FIG. 7 is a diagram depicting perceived locations of a ballast delivery consist provided by a navigation system and plotted relative to a known track location and depicting the operational state of the consist in accordance with an embodiment of the invention;

FIG. 8 is a diagram depicting perceived locations of a ballast delivery consist provided by a navigation system and plotted relative to a known track location and depicting the operational state of the consist when the consist is within a minimum safe distance to a railroad facility in accordance with an embodiment of the invention;

DETAILED DESCRIPTION

Figure 4:
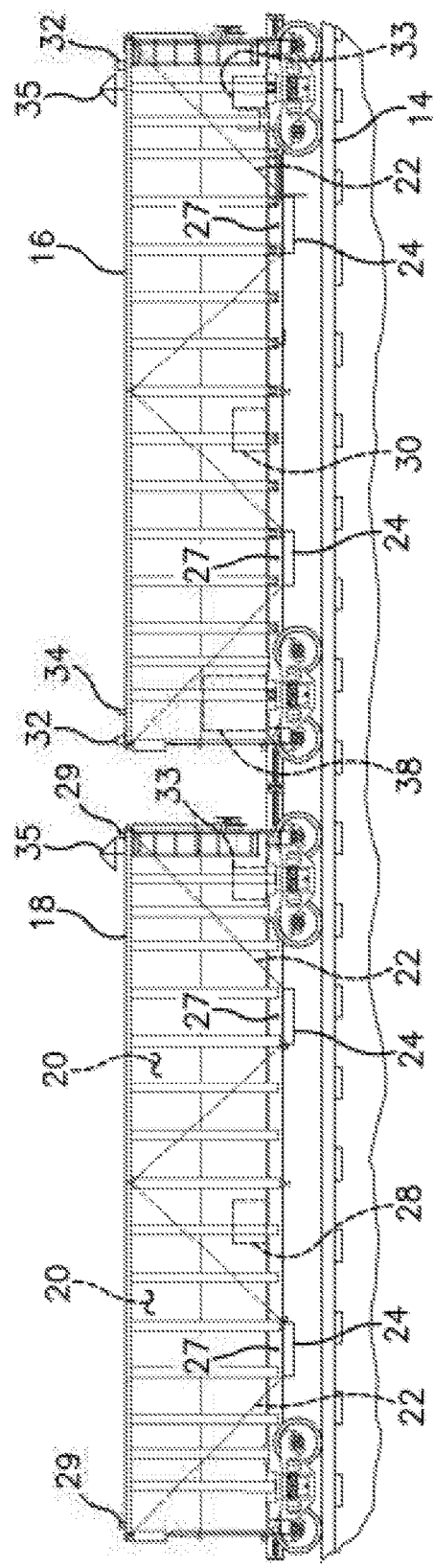
FIG. 4 is a side elevational view of a control car and a hopper car of a ballast delivery consist depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

Embodiments of the invention include apparatus, systems, and methods for autonomous spreading of ballast on a railroad on a large-scale basis using multiple ballast hopper cars spreading simultaneously, at times. Embodiments employ various different techniques for controlling spreading of ballast relative to a track survey and railroad facilities, location of a ballast consist, and operational state data of the ballast consist. The system allows the ballast train to spread ballast while traveling within a large range of speeds and to adjust the rate of ballast unloading based on that speed.

With initial reference to FIGS. 1-4, a ballast delivery consist 10 may include one or more power units 12 or propulsion units for propelling the consist 10 along a railway 14, a control car 16, and a plurality of hopper cars 18. In one embodiment, the hopper cars 18 and the control cars 16 are included in the consist 10 in a ratio of about one control car 16 per about thirty hopper cars 18 or less, however other ratios may be employed. Multiple sets of the control cars 16 and the hopper cars 18 can be combined in the appropriate ratios up to the physical limits of the propulsion units 12, the railway, and/or the cars 16, 18 themselves to increase the serviceable area of the consist 10. For example, three sets of thirty hopper cars 18 and one control car 16 can be combined to provide a consist 10 having ninety hopper cars 18 and three control cars 16, thereby extending the serviceable range of the consist 10 by a factor of three.

Figure 5:
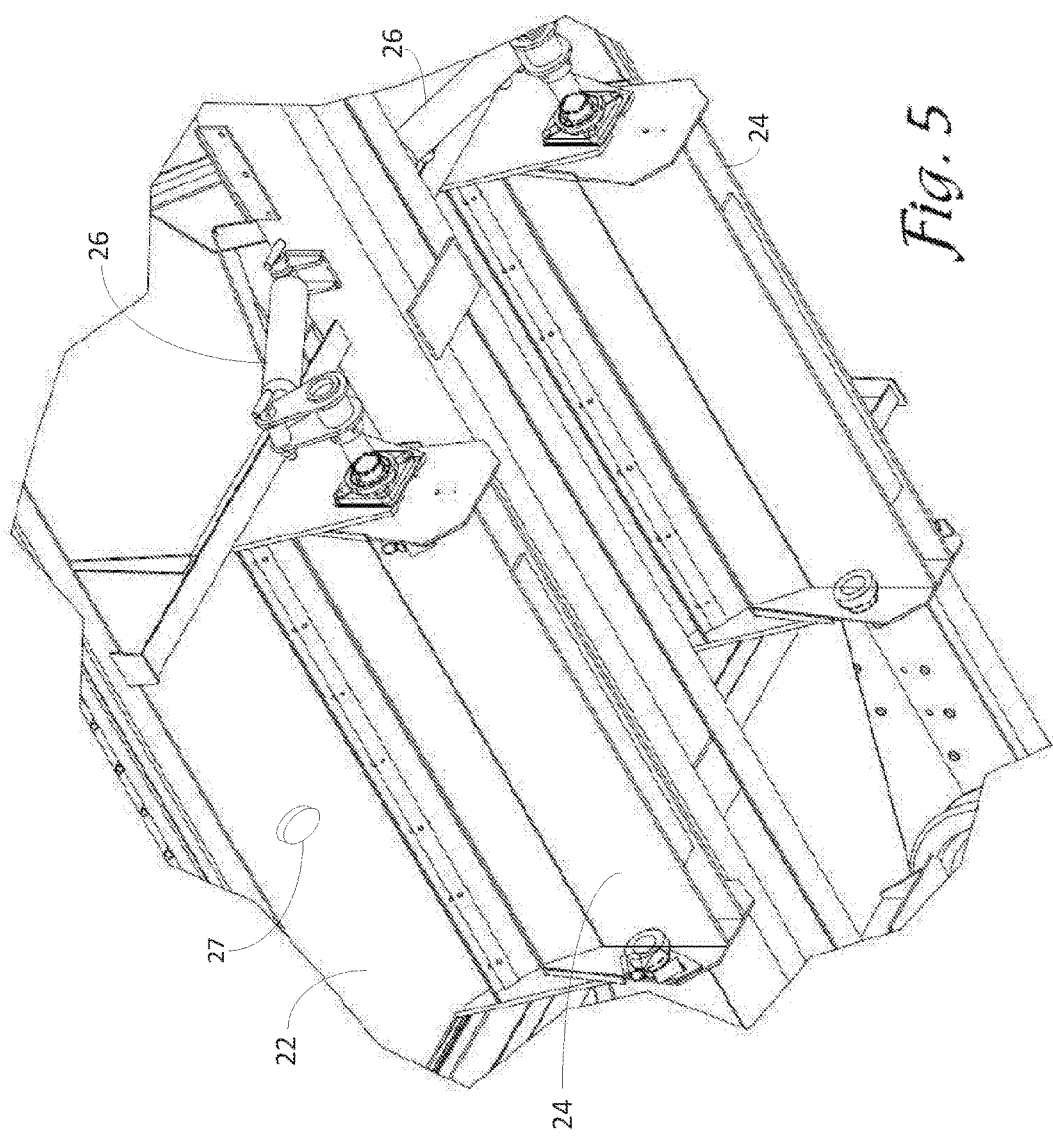
FIG. 5 is an enlarged fragmentary perspective view of a ballast discharge chute including a ballast door and actuator depicted in accordance with an embodiment of the invention.

As depicted in FIGS. 4 and 5, each hopper car 18 may include two longitudinally adjacent hoppers 20, left and right ballast chutes 22 for each hopper 20, a ballast door 24 for each chute 22, and an actuator 26 for each door 24. The actuator 26 can be hydraulically, electrically, pneumatically, mechanically or otherwise operated and can be controlled to open its associated door 24 to an inboard direction, between the rails, or to an outboard direction, outside of the rails. Each hopper 20 can hold a known load of a particular type of ballast, and the average flow rate of a given type of ballast through a ballast door 24 may be known. Although embodiments of the invention are described herein with respect to unloading ballast materials, the material that can be unloaded from the hopper cars 18 is not so limited.

Each hopper car 18 has car logic circuitry, referred to as a car control unit or CCU 28 that controls operation of the actuators 26, monitors functions on the car 18, and operates under the direction of the control car 16. A variety of sensors may be included on the hopper car 18 and communicatively coupled to the CCU 28, such as ballast door position sensors, vibration sensors 27 that sense vibrations caused by ballast material flowing through the chute 22, or the like. Location sensors, such as a global positioning system (GPS) unit 29 or inertial sensors may also be included on the hopper cars 18.

Figure 6:
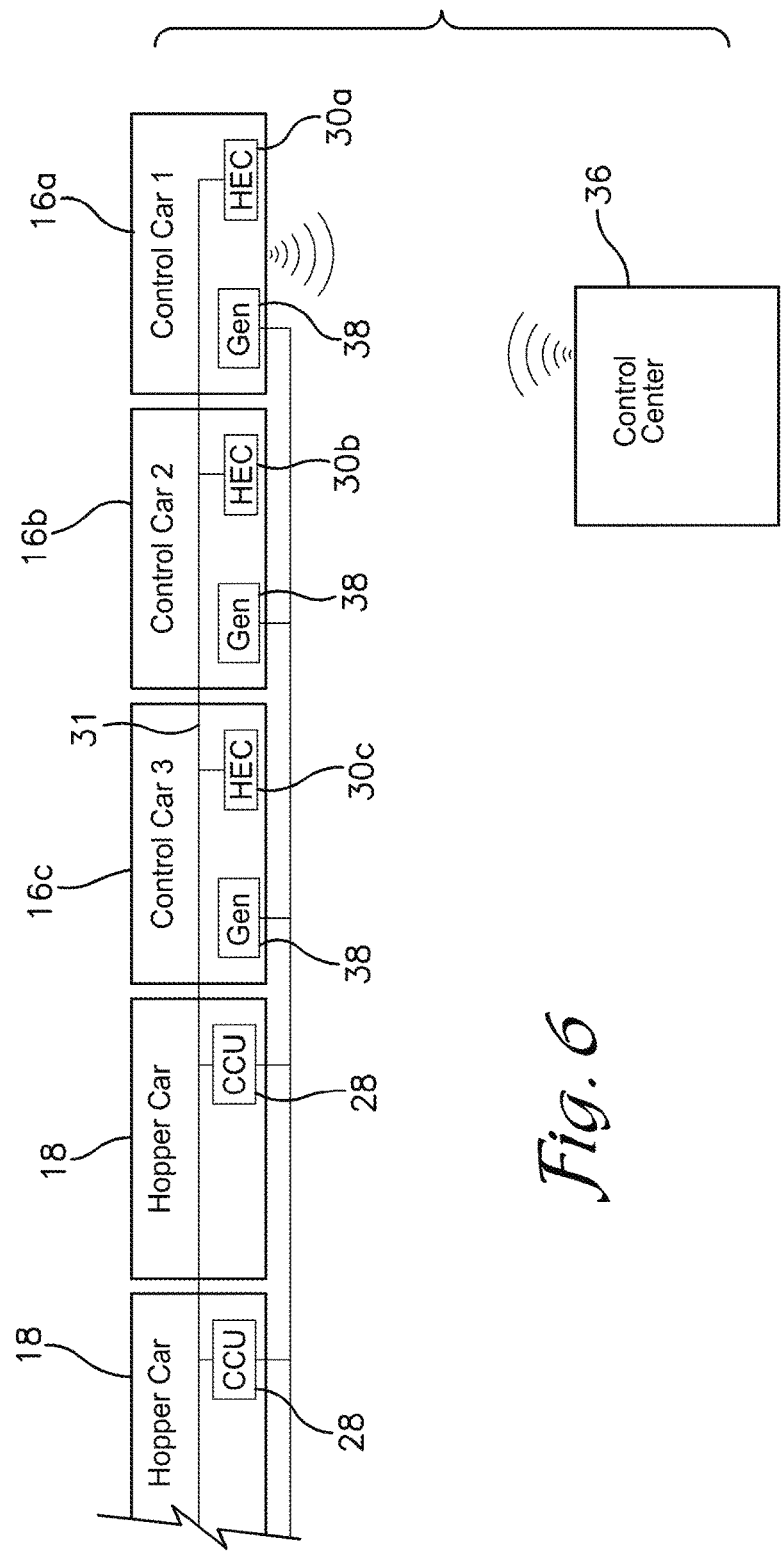
FIG. 6 is diagrammatic view of a ballast delivery consist depicting control hardware disposed on each car and a remotely located control center in accordance with an embodiment of the invention.

As depicted in FIGS. 4 and 6, the control car 16 is configured similarly to the hopper car 18 but for the addition of a master controller 30 or network control unit configured to control operation of the hopper cars 18 via their respective CCUs 28 and one or more generators 38. As such, the control car 16 also functions as a hopper car 18. In another embodiment, the control car 16 does not include a hopper 20. The control car 16 and each of the hopper cars 18 may include one or more batteries 33 and one or more solar panels 35. The solar panels 35 along with the generator 38 on the control car 16 may charge the batteries 33 which in turn provide power to their respective car 16, 18 for operation of their respective systems, e.g. the master controller 30, the CCU 28, pumps, the actuators 28, and GPS units 29, among others.

The master controller 30 is configured to monitor and control operations of the consist 10 autonomously, without need for input from a human operator on the consist or located remotely. The master controller 30 need only be provided with a survey indicating locations and amounts of ballast to be unloaded.

The master controller 30 communicates with the CCUs 28 through a network including a bus 31 referred to at places herein as a "wireline" although the bus 31 may employ wired or wireless communications. The bus 31 extends from the master controller 30 through and/or to the CCU 28 of each hopper car 18. The master controller 30 comprises a computing device that may be specially designed for the particular implementation or may be a general purpose type of computer.

The master controller 30 includes or is communicably coupled to a navigation system 32. The navigation system 32 includes one or more of a GPS receiver, a differential GPS receiver, one or more inertial sensors or inertial guidance systems (including accelerometers, gyroscopes, and the like), wheel encoders, radar units, LIDAR units, thermal sensors, magnetic sensors, laser units, and imaging units, among other available devices useable to determine location and/or motion of the control car 16.

The master controller 30 also includes one or more communications components 34 configured to transmit and receive data over satellite, cellular, radio, telephone, or other long- and/or short-range networks. The master controller 30 preferably includes a plurality of redundant communications components 34 of varying type to enable at least minimal communications between the master controller 30 and a remote, disparate, control center 36 at all or nearly all times. One or more of the communications components 34 may be designated as a primary communication component 34 that is configured to transmit/receive a large amount of data (e.g. multiple full track survey and ballast-spreading data files or a full manifest of the ballast consist 10 status) when the consist 10 is located within a region that receives adequate communications service. Other communications components 34 may be configured for transmitting small amounts of data, e.g. simple consist operational state data, when the consist 10 is located in areas with poor communications facilities or service such as in a remote valley. For example, the primary communication component 34 may comprise a satellite communications component or a cellular telecommunications component that employs long-term evolution (LTE or 4GLTE) standards for high-speed data transmission while a secondary communication component 34 might comprise a short wave radio that can transmit limited amounts of data over a long range. Data transmissions and the files or data transmitted may be timed and/or configured to reduce data usage and data transmission costs.

The control car 16 also includes one or more generators 38 that provide electrical, hydraulic, or pneumatic power to the hopper cars 18 for operation thereof. In one embodiment, the generators 38 provide electrical power to each of the hopper cars 18 for operation of their respective CCUs 28 and to power a hydraulic and/or pneumatic pump disposed on each respective hopper car 18 for operation of the ballast door actuators 26. In such a configuration, pumps on hopper cars 18 that are not actively dumping ballast can be powered down to conserve energy (discussed more fully below with respect to FIGS. 17-19).

In another embodiment depicted in FIG. 6, a plurality of control cars 16a, 16b, 16c are included in the consist 10. One of the control cars, here control car 16a, is selected as a master or primary control car. As such, the controller 30a of the control car 16a controls operation of the consist 10 while the controllers 30b and 30c lay dormant or unused. However, the generators 38 of each of the control cars 16a, 16b, 16c are each employed to provide sufficient electrical, hydraulic, and/or pneumatic power to the hopper cars 18. In another embodiment, each of the controllers 30a, 30b, 30c each control a subset of the hopper cars 18; one of the controllers 30a, 30b, 30c may be a primary or master controller that provides instruction to the remaining controllers, operating as secondary or slave controllers, for controlling their respective hopper cars 18. It is understood that other configurations and/or control structures may be employed with the controllers 30 and CCUs 28 for operation of the consist 10; such other configurations are within the scope of embodiments of the invention described herein.

The control center 36 comprises a station that may be geographically located far from the railway 14 on which the consist 10 is being operated. The control center 36 includes computing devices, databases, monitors, and the like along with personnel that monitor the operation of the consist 10. Preferably, the control center 36 only need provide the spreading surveys to the consist 10 and ensure the consist 10 is properly loaded and assembled for the consist 10 to then automatically carry out the spreading operation. The control center 36 can, however, monitor the consist 10 for faults and take the consist 10 out of operation if necessary or desired.

Spreading surveys can be communicated to the consist 10 from the control center 36 for spreading of ballast as required by the survey. Data indicating the state of the actual spreading of ballast by the consist 10 may then be communicated back to the control center 36 for tracking and logging. As such, the control center 36 may maintain a master ballast spreading manifest to be fulfilled by a plurality of ballast consists 10 operating at different locations and times across a large geographic area, e.g. across an entire country or region. The control center 36 can provide a plurality of the ballast spreading surveys for a given region to consists 10 operating in the region and update the surveys as they are all or partially fulfilled. As such, any time one of the consists 10 travels through an area in need of ballast replenishment, the consist 10 can spread ballast to fulfill the existing requirements. Accordingly, shortages or missed zones in a given survey can be fulfilled without directly scheduling a particular consist 10 or other unloading vehicle to dump ballast in the particular area.

In order to control the spreading of ballast on a length of track, it is necessary to obtain the geographic location of the track and areas along the track in need of ballast replenishment. This is most conveniently accomplished by a survey run on the track using a road vehicle equipped with flanged wheels for traveling on rails, such as a Hy-Rail vehicle (trademark of Harsco Technologies Corporation). The track survey vehicle may be equipped with a suitable instrument for determining the location and with a computer and track survey software. As the survey vehicle travels along the track, the survey crew, which may be or include a "roadmaster," marks spread zones where ballast is to be spread and no-spread zones, such as those around railroad facilities like bridges, road crossings, and the like, where ballast is not to be spread. The locations of the spread and no-spread zones are recorded by the instrument, which can take a variety of different forms.

Alternatively, other procedures for determining the spread and no-spread coordinates are foreseen. For example, if a previously obtained track coordinate data file is available, it is foreseen that it could be processed to designate spread and non-spread zones. Further, under some circumstances, track surveying may even be conducted on a ballast delivery train like the consist 10, forward of concurrent ballast spreading activity. Under normal circumstances of pre-spread surveying, a track survey data file is created which is transferred to the master controller 30 for processing during a ballast spreading run.

In addition to surveying the track for its coordinates to thereby locate zones requiring ballast and those on which ballast is not desirable, it is necessary to survey the ballast consist 10 for the identity, order, and orientation of each control and hopper car 16, 18 in the consist 10. As depicted in FIGS. 1-3, the control cars 16 and the hopper cars 18 can be assembled into the ballast train in any random order and with some cars 18 oriented front-to-rear while the rest are oriented rear-to-front. It is not economically feasible to assemble the ballast consist 10 in any particular order or to change the orientation of any particular car 10. However, the master controller 30 determines the order and orientation of the cars 18 to enable communication of ballast door commands to the proper car 18 during ballast spreading.

When assembling the consist 10, the relative location of each ballast door 24 on each hopper car 18 of the consist 10 will be determined in relation to a known reference location. Ordinarily, the ballast consist 10 will use a plurality of virtually identical hopper cars 18 with known distances between the ballast doors 24 on a given car 18 and between the ballast door 24 of one car 18 and the next adjacent car 18.

In one embodiment, each CCU 28 includes a designated front Discrete Auto-Manifest (DAM) relay and a designated rear DAM relay, both of which are normally inactive. These discrete lines are independent control lines residing within the interconnecting wireline cable that connects each car 16, 18 to the network. In the process of surveying the CCUs 28 of the hopper cars 18, the master controller 30 may query the CCUs 28 to report their identities, such as by providing a neuron identification number. Then, through an iterative procedure of commanding the cars 18 to open their front and then rear DAM relays and report their identities, the master controller 30 can determine the order of the cars 18 and their orientations. In particular, after the identities are determined, the master controller 30 may broadcast a command for a selected car 18 to activate its front DAM relay. Then the master controller 30 may call for any cars 18 that see a DAM line active to identify itself. The same car 18 is then instructed to activate its rear DAM relay and the interrogation is repeated. This process is repeated using the cars 18 that responded to the previous interrogations until all cars 18 are linked together. The data file of identified, ordered, and oriented hopper cars 18 is stored as a manifest data file. It is understood that other methods may be employed to query and determine the arrangement and orientation of the cars 18 without departing from the scope of embodiments described herein. For example, each of the cars 16, 18 may be provided with a second location sensor, such as the GPS unit 29 or the navigation system 32. The two GPS units 29 or navigation systems 32 on the car 16, 18 may be disposed at opposite ends of the car 16, 18 such that location data provided by the two location sensors can be used to determine the orientation of the respective car 16, 18.

The spreading of ballast may be controlled in terms of the amount or weight of ballast spread per unit of track length. From historic experience and for accounting purposes, the required quantity of ballast may be determined in tons per mile. While such a scale is more convenient for determining the cost of the operation, it is generally too coarse for dynamic control of ballast spreading at a relatively high traveling speed. The track length may be divided into "buckets" which are "filled" to achieve an overall desired number of tons of ballast per mile. The length of the buckets may be any convenient length and may be set at one-foot lengths of track, for example. Each ballast door 24 can spread either to the inboard side or the outboard side, and both can be effected at the same time. Each bucket has designated coordinates that may include the GPS coordinates of a set of buckets along with a sequential member of such a set. The bucket coordinates are derived by processing a previously generated track survey file.

The spreading process tracks the current location of the consist 10 reference point in terms of its "bucket" location, the current load of ballast in each hopper car 18, the fill percentage of each bucket, the state of each door 24 as closed or opened and in which direction, and the speed of the consist 10. Because of the lag in response of the ballast door actuators 26 and the movement of the ballast and because of the movement of the consist 10, the spreading process may "look ahead" in order to effectively correlate a door state to a given bucket. The spreading process can be timer driven and begins executing a series of actions at each timer interval or "tick". The timer interval may be at 100 milliseconds or one tenth of a second or other interval. Spreading actions are affected by the speed and location of the consist 10 and, thus the calculations factor in the speed and location. In contrast, the flow rate of ballast through a ballast door can generally be considered to be a constant, e.g. approximately 13.5 tons per minute. Preferably, the ballast doors 24 are operated in such a manner as to be considered fully closed or fully open; however, the present invention foresees the capability of operating with the ballast doors 24 in partially open states and the use of flow sensors 27 as described more fully below.

At each clock tick, the state of each ballast door 24 in succession can be checked along with a "lookahead" set of buckets and, if the door 24 is currently open, the fill percentage of a current bucket or set of buckets which will receive ballast from the door 24 in the current time interval. If the door 24 is closed, the state of the lookahead bucket set is checked to determine if opening the current door will exceed the target fill of those buckets. If not, the current door 24 is opened. If the current door 24 is already open, the fill percentages of the current bucket set are updated, and the lookahead bucket set is checked to determine if the current fill exceeds the target fill. If not, the door stays open.

In general, the threshold to keep a door 24 open is not as strict as the threshold to open a closed door 24. In zones where spreading is desired, it is preferable to spread somewhat more than the target fill than less. Subsequent maintenance activity involves crews who will properly position the ballast and tamp it into place. Thus, a small excess of ballast is preferable to an inadequate amount. However, in the case of a no-spread zone, any ballast which is deposited may constitute a hazard, such as on a road crossing, and may require a clean-up. For processing purposes, buckets in no-spread zones are initialized as full so that lookahead routines which encounter them always require the current door to close (if open) or to remain closed.

The spreading process may continue until all buckets of a spreading run are filled, all ballast from the hopper cars 18 is exhausted, or until the process is interrupted by the master controller 30 due to a detected location inaccuracy, hopper car malfunction, or timeout due to inactivity. The process may also be manually terminated by an operator at a remote control-center or by an operator on a car associated with the ballast consist 10, e.g. engineers in the power unit 12, that may manually terminate the spreading process via an emergency stop when necessary.

Ballast may initially be supplied from the forward most hopper cars 18, moving rearward as the ballast is exhausted from the forward cars 18, or the ballast may be supplied from hopper cars 18 selected according to a desired algorithm, sequence, or randomly. If functions on a hopper car 18 are inoperative, the car 18 is placed in a "wait" state in which the ballast doors 24 are closed and the car 18 is bypassed in processing. It may be necessary to bridge the computer network across such a "dead" car.

Upon recognizing a fault in the hopper car 18, the master controller 30 may analyze the path ahead of the consist 10 to identify a location in which to attempt a forced unload of the faulty hopper car 18. The master controller 30 may identify a "safe" location that includes buckets to be filled and that is at least a predetermined distance from a railroad facility, e.g. a switch, road crossing, bridge, or the like. Upon reaching the identified safe location, the master controller 30 can attempt to open the ballast doors 24 of the faulty car 18. If the open command is successful, the master controller 30 can make record of the dumped ballast toward filling of the buckets at the safe location and can log the faulty car 18 for inspection upon returning to a maintenance location. The logging of the faulty car 18 may be stored internally at the master controller 30 and is preferably also communicated to the control center 36. If the open command is unsuccessful, the master controller 30 can command the doors 24 to be closed and retain the doors in the closed state until reaching a maintenance location.

In either event, the attempt to unload the faulty car 18 is completed in a safe location in which the ballast can be safely and conveniently offloaded. And if the ballast door 24 is only able to partially open, then it is allowed to do so in a location far enough from railroad facilities that the associated hopper 20 should empty before reaching such a facility and risking damage thereto.

It is possible that some buckets, particularly near the end of a spreading run, will not be completely filled. Thus, it is desirable to save data representing the final state of any unfilled buckets for a future spreading run and/or communicating such data to the control center 36. It may also be desirable to save the final state of all buckets and hopper cars for record keeping and accounting purposes.

With additional reference now to FIGS. 7 and 8, the master controller 30 monitors the geographic location of the consist using the navigation system 32 not only to carry out dumping of ballast as required by the survey but also to ensure safe operation of the consist 10. The redundant subsystems of the navigation system 32 enable continuous tracking of the location of the consist 10 when one or more of the subsystems encounters decreased accuracy, goes offline, or becomes inoperable. For example, the accuracy of the location indicated by a GPS unit may degrade as the consist 10 travels through mountainous terrain and the satellite signals used by the GPS unit are blocked or other errors surface in the location calculations. Other subsystems may be employed to account for or make up for the inaccuracies of the GPS-based location. For example, a wheel encoder provides an indication of the distance traveled and inertial sensors, such as accelerometers and gyroscopes provide indications of the speed, acceleration, and direction of travel which can be used to correct a determined GPS-based location or to determine a location outright.

Inaccuracies in the calculated location are referred to generally hereinafter as "drift", however such is not intended to limit the types or causes of inaccuracies in the calculated location that can be observed, overcome, or operated under by the master controller 30 in embodiments of the invention. The drift, can be based on or calculated using a variety of known methods including a root-mean-square (RMS) error value, circular error probable (CEP) value, or spherical error probable (SEP) value.

The master controller 30 is configured to account for and operate in accordance with various amounts of drift. For example, as depicted in FIG. 7, the master controller 30 can control the operational state of the consist 10 relative to the observed amount of drift. FIG. 7 depicts an exemplary plot of perceived locations 40 of the consist 10 relative to a track 42. In a given real-world application of embodiments of the invention, the locations 40 may vary from being on the track 42 to greater than six meters to either side of the track 42. The master controller 30 monitors the location based on predetermined ranges to either side of the track 42, e.g. less than or equal to 3 meters to either side, less than or equal to 6 meters to either side, and greater than 6 meters to either side. Other ranges can be employed without departing from the scope of embodiments of the invention described herein. Although, distance measurements to either side of the track 42 are described herein, it is understood that ranges of other values, such as an RMS value can be employed without departing from the scope of embodiments described herein.

The master controller 30 controls the operational state of the consist 10 based on the perceived location 40 thereof within these ranges. When the location 40 is within 3 meters to either side of the track 42, that location is considered to be correct and the master controller 30 continues normal operation of the consist 10, e.g. the hopper cars 18 are maintained in the active state and unloading thereof is carried out following the requirements of the track survey. As the drift increases and the perceived location 40 is between 3 and 6 meters to either side of the track 42, the location 40 is locked orthogonally back to the track 42 to provide an operational location 44. For example, as depicted in zones 46 in FIG. 7, the operational location 44 is identified as a point along the track 42 at which a line drawn from the perceived location 40 to the track 42 intersects the track 42 at a right or orthogonal angle. Or the operational location 44 is the point on the track 42 that is the shortest distance from the perceived location 40. When the perceived location 40 drifts beyond 6 meters to either side of the track 42, such as in zone 48 in FIG. 7, the master controller 30 places the consist 10 in a "wait" state in which the ballast doors 24 are closed and dumping is halted. When the perceived location 40 is again within 6 meters to either side of the track 42, the master controller 30 places the consist 10 back in the active state and dumping continues as per the track survey requirements.

The master controller 30 can also take into account the location of the consist 10 relative to railroad facilities along the track 42 when determining how to handle drift in the perceived location 40 thereof. The master controller 30 can be configured to observe a minimum safety window around railroad facilities in which the handling of drift is more restrictive. As depicted in FIG. 8, when the consist 10 is within 200 meters of a facility, the consist 10 continues to operate normally while the drift in the perceived location 40 is less than or equal to 3 meters to either side of the track 42. When the perceived location 40 drifts further than 3 meters away from the track 42, the consist 10 is placed in the wait state as shown by zones 50, rather than simply locking the perceived location 40 to the track location to provide an operational location 44 as is done when the consist is further from the railroad facilities. As such, the railroad facilities can be protected from inadvertently dumping thereon due to inaccuracies in the perceived location 40 of the consist 10. Other distances to either side of the track 42 and from the railroad facility can be employed in embodiments of the invention without departing from the scope described herein.

It is also possible that the consist 10 travels off of the track 42 onto a siding or another track altogether as a result of, for example, a need to give way to other rail traffic or a switch being incorrectly thrown. In such an instance, the master controller 30 is configured to identify that the perceived location of the consist 10 is within a given distance of a switch or other railroad facility. Thus when the location of the consist 10 as indicated by the navigation system 32 moves off-track, the master controller 30 determines that consist 10 has moved onto the siding or other track and that the perceived off-track location of the consist 10 is not a result of drift, but rather a result of being off-course. The master controller 30 can then place the hopper cars 18 into the wait state to avoid dumping ballast on the switch or railroad facility and on the siding; if the track survey indicates that ballast is needed along the siding, the master controller 30 can maintain the hopper cars 18 in the active state to continue dumping along the siding as required by the survey.

Figure 9:
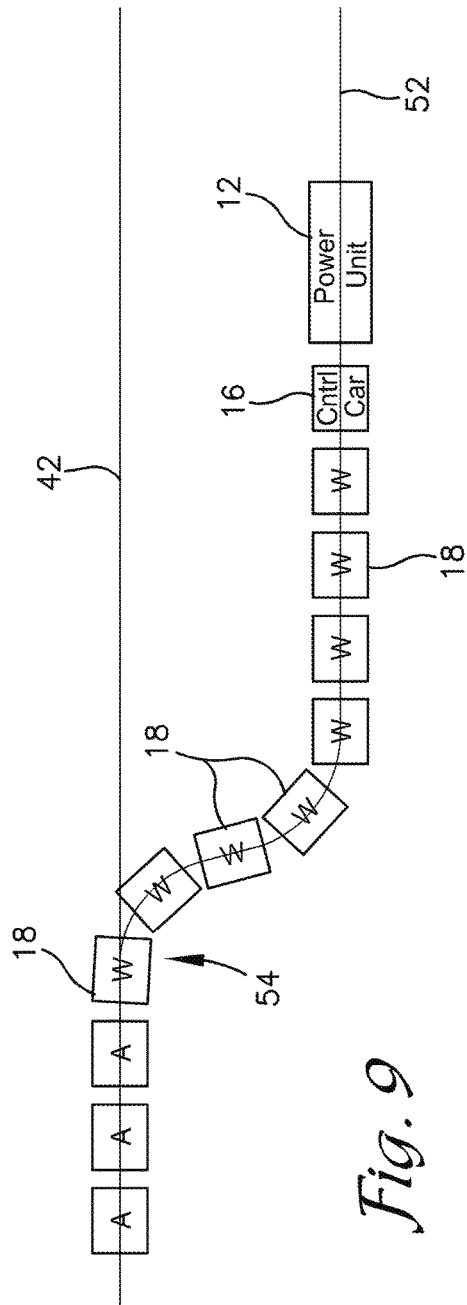
FIG. 9 is a diagrammatic overhead view of a ballast delivery consist that is taken off course depicting an operational state of hopper cars in the consist in accordance with an embodiment of the invention.
Figure 10:
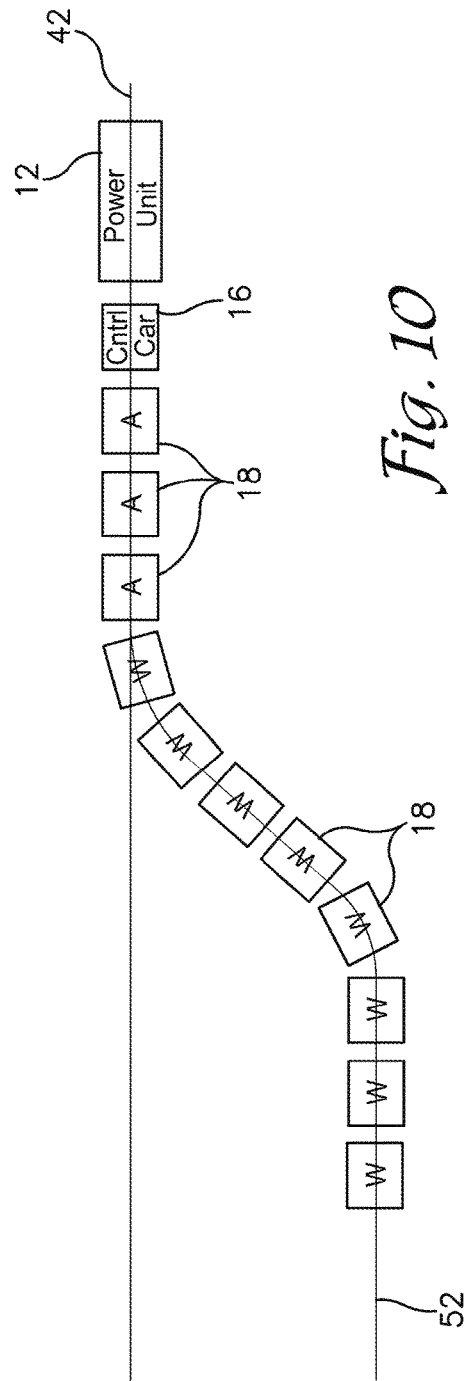
FIG. 10 is a diagrammatic overhead view of a ballast delivery consist that is moving onto a desired route depicting an operational state of hopper cars in the consist in accordance with an embodiment of the invention.

As shown in FIG. 9, the master controller 30 can place all of the hopper cars 18 into the wait state when it determines that the consist 10 is off course (moved from the track 42 to a siding 52), or the master controller 30 can successively place the hopper cars 18 into the wait state in succession as they reach a predetermined distance to a switch 54 (hopper cars 18 are indicated as being in the wait state or active state in FIGS. 9 and 10 by the labels W and A, respectively). The master controller 30 can then successively place the hopper cars 18 back into the active state to resume dumping per the track survey as they move from the siding 52 back onto the track 42, as depicted in FIG. 10. The switch 54 and siding 52 or other railroad facility are thereby protected from unwanted dumping of ballast thereon. The consist 10 is enabled to remain operable during an off-course or fault event and to resume normal operation upon correction of the off-course/fault event.

Figure 11:
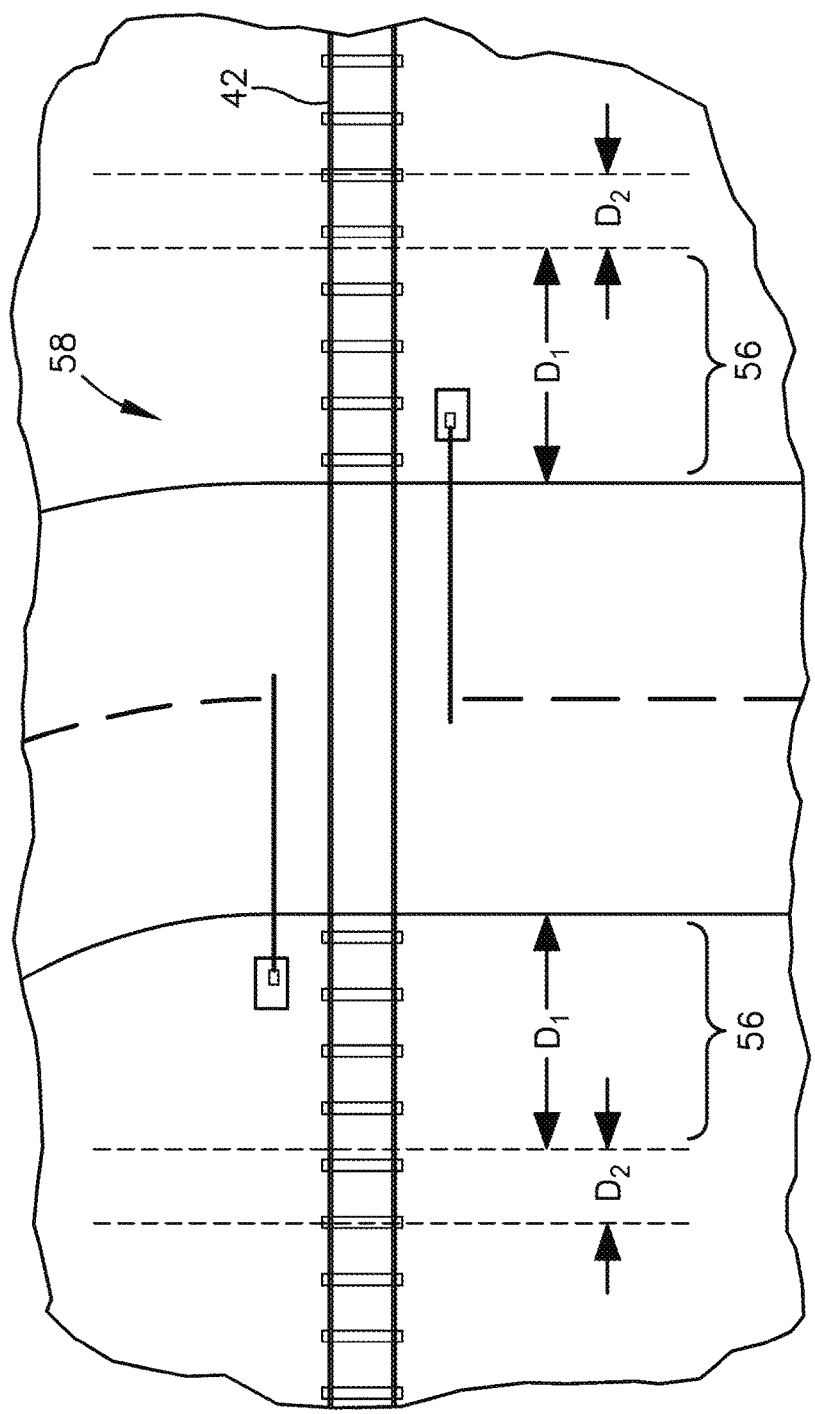
FIG. 11 is an illustrative view of a railroad crossing depicting a dynamically adjusted safety buffer therearound in accordance with an embodiment of the invention.

With reference now to FIG. 11, a safety buffer or "safety buckets" 56 are employed to further protect railroad facilities such as a crossing 58 from unwanted ballast unloading thereon. Safety buckets 56 comprise one or more buckets of the track survey located on each side of a rail facility, e.g. the crossing 58 that are designated as no-spread buckets or full buckets. The safety buckets 56 thus form a buffer zone extending a distance D1 to each side of the crossing 58. The distance D1 can be the same or different on each side of the crossing 58. The distance D1 can be as little as a few meters, e.g. 3 meters, to as much as 20 meters or more as needed to ensure that no dumping takes place on the crossing 58.

The master controller 30 employs its measurement of the drift associated with the location provided by the navigation system 32 to dynamically adjust the safety buckets 56 relative to the amount of drift and/or a confidence level associated with the perceived location. For example, as the amount of drift or an RMS error value associated with the perceived location increases the confidence level in the perceived location decreases. The master controller 30 thus cannot ensure that the location of the consist 10 (and each hopper car 18 therein) is accurately portrayed by the data received from the navigation system 32. As the drift increases, the master controller 30 can dynamically increase the size or number of safety buckets 56 on each side of the crossing 58 to increase the size of the buffer around the crossing 58 by a distance D2 on each side thereof. The distances D2 may be equal on each side of the crossing 58 or may be different. Further, the distance D2 may be increased or decreased as the drift increases/decreases.

Figure 12:
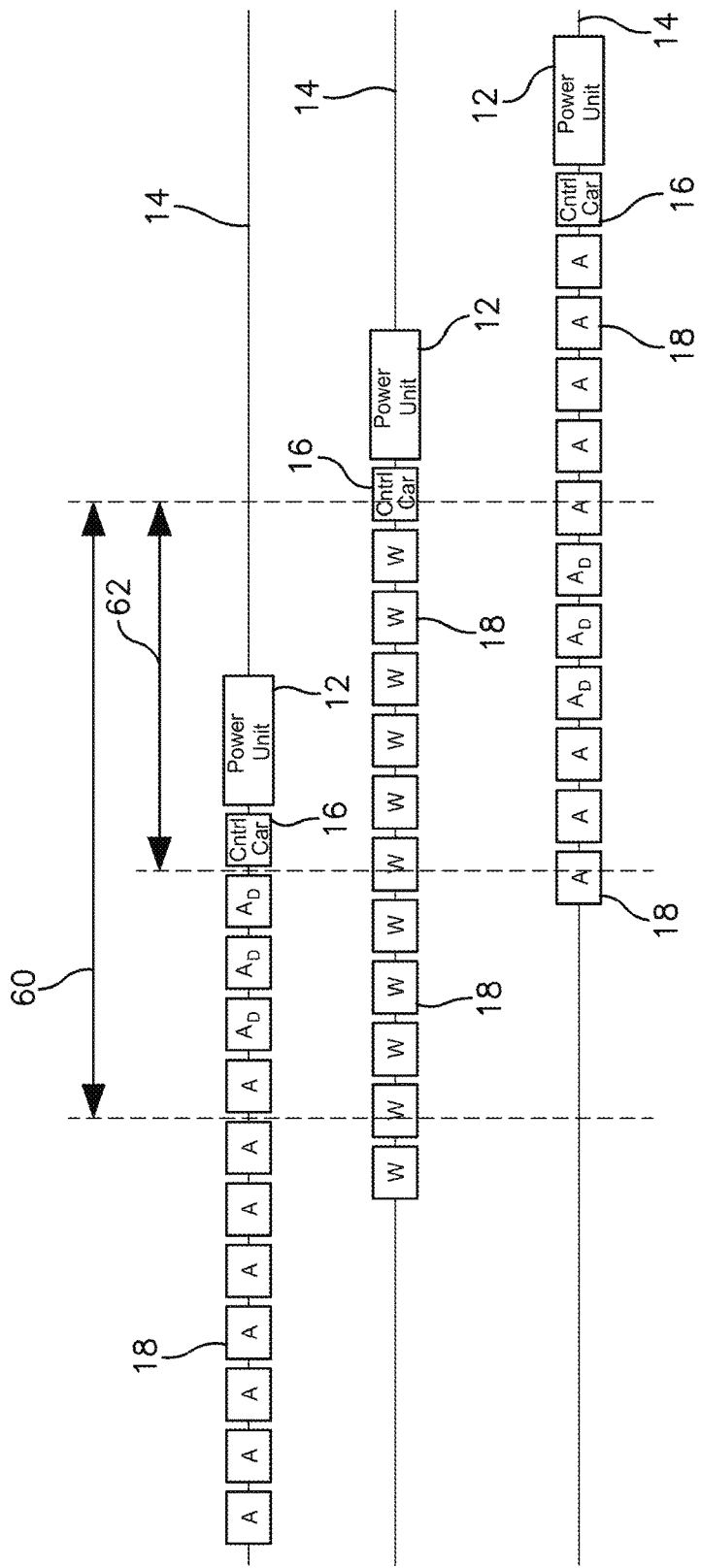
FIG. 12 is a diagrammatic view of a ballast delivery consist at sequential locations as it passes through a dump zone and showing operational states of hopper cars in the consist in accordance with an embodiment of the invention.

When placing one or more of the hopper cars 18 into the wait state, the master controller 30 tracks and records areas of the track survey in which insufficient amounts of ballast are dumped. FIG. 12 depicts the progression of the consist 10 along the track 42 through an area in which the track survey indicates a need for ballast to be dumped, e.g. a dump zone 60. The master controller 30 commands one or more of the active hopper cars 18 (labeled "A") to open their ballast doors 24 to commence dumping (dumping cars labeled "AD"). During the dumping process and travel of the consist 10 through the dump zone 60, the master controller 30 may place the hopper cars 18 into the wait state (labeled "W") due a variety of potential issues such as a degradation in the GPS location data, or a fault, among other issues. As such, a portion 62 of the dump zone 60 is left unfilled because the consist 10 is not dumping while traveling therethrough.

When the problem issue is remedied, e.g. the location accuracy returns to an acceptable level, the master controller 30 can return the hopper cars 18 to the active state. If one or more of the hopper cars 18 are still within the portion 62 of the dump zone 60 that was not completely fulfilled, those hopper cars 18 can be caused to open their ballast doors 24 to commence dumping in the unfilled portion 62 to make up for lack of dumping while the consist 10 or one or more of the hopper cars 18 therein was in the wait state. The master controller 30 records the amount of ballast dumped by hopper cars 18 in the unfilled portion 62 and records any shortages that may remain. Shortages may remain due to insufficient ballast in the respective hopper cars 18 or an insufficient number of hopper cars 18 remaining in the unfilled portion 62 to dump the required amounts of ballast based on the speed and/or position of the consist 10 when dumping is resumed, among other reasons.

As discussed previously, it may be preferable to dump ballast from the consist 10 from hopper cars 18 near the front of the consist 10 first and to move sequentially rearward from one hopper car 18 to the next. As such, hopper cars 18 near the end of the consist 10 should remain full of ballast for dumping until the remainder of the consist 10 has been emptied and can be employed to make up unfilled portions, like the portion 62 depicted in FIG. 12, when hopper cars 18 nearer to the front of the consist 10 are placed in the wait state while traveling through dumping zones 60. When making up dumping in unfilled portions 62, it is also preferable to dump from the forward-most hopper cars 18 passing through the portion 62 first so as to retain ballast in the rearward hopper cars 18 as long as possible. As such, the ability of the rearward-most hopper cars 18 to make up dumping in the unfilled portions 62 is maximized. The master controller 30 therefor keeps a detailed record of each hopper car's dumping, not only to record whether the track survey has been fulfilled, but also to determine the ability of the hopper car 18 to make up dumping in unfilled portions 62 of dump zones 60.

Figure 13:
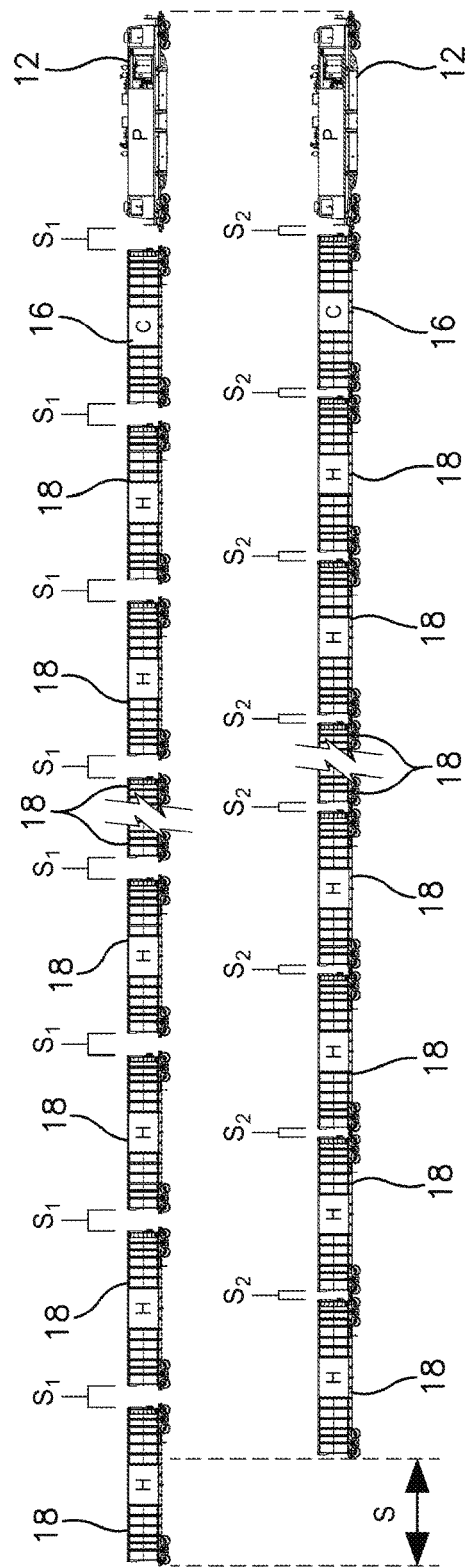
FIG. 13 is a diagrammatic view of a ballast delivery consist showing a difference in the length of the consist resulting from coupler slack take up.

Referring now to FIG. 13, coupler slack can affect the ability of the master controller 30 to precisely calculate the location of each hopper car 18 within the consist 10. The couplers that connect each of the cars 16, 18 together allow some movement of the cars 16, 18 longitudinally relative to one another. This movement is compounded over the length of the consist 10. As such, a hopper car 18 near the end of a long consist 10 might move greater than 6 meters longitudinally relative to the front of the consist 10 depending on whether the coupler slack is taken up or stretched out. FIG. 13 depicts the consist 10 in a fully extended position in which the coupler slack is stretched out a distance S1 between each of the cars 16, 18 and in a compressed position in which the couplers slack is taken up to place the cars 16, 18 a distance S2 apart. A difference in the length of the consist 10 when extended and compressed is indicated by the measurement S. The distance between each of the cars represented as S1 may not be equal between each of the cars 16, 18 due to variation in the couplers; similarly, the distances S2 may also be variable from one car 16, 18 to the next.

Accordingly, in one embodiment each of the hopper cars 18 includes a GPS unit 29, disposed thereon that is useable to determine the location of the hopper car 18 relative to the control car 16 and/or the master controller 30. Other devices, such as those employing lasers, radio waves, or the like might also be employed instead of or in addition to the GPS unit 29 to aid determining a distance between the respective hopper car 18 and the control car 16. Using the GPS units 29, the master controller 30 can more precisely determine the distance between the control car 16 and the respective hopper cars 18 and/or the location of the hopper cars 18 relative to the track survey. As such, the master controller 30 can more precisely determine when or where to open/close the ballast doors 24 of the hopper cars 18 for proper dumping of the ballast.

Similarly, some consists 10 will include more than one control car 16. Each control car 16 includes a respective navigation system 32. The primary master controller 30 can use the navigation systems 32 of the other control cars 16 to determine a distance between the primary control car 16 and the other control cars 16. Because the primary master controller 30 knows the location of each of the control cars 16 and hopper cars 18 relative to one another, the master controller 30 can use the location data associated with the other control cars 16 to aid in determining an amount of coupler slack present within the consist 10. In an ideal situation, the primary control car 16 and master controller 30 will be the first car in the consist 10 while a second control car 16 would be last in the consist 10. The primary master controller 30 would thus be able to relatively precisely determine the amount of coupler slack present in the consist 10; however, such ideal configurations may not be likely in real world application due to difficulties in arranging and organizing the cars 16, 18 when forming the consist 10.

In another embodiment, the master controller 30 employs a track survey that includes topographic data for the railway 14. The master controller 30 can thus determine when the consist 10 is traveling uphill/downhill, is cresting a hill, or crossing a valley. The master controller 30 may then use this data and predetermined values for S1 and S2 to at least partially accommodate for the effect of coupler slack based on the location of the individual hopper cars 18. For example, when traveling uphill, the master controller 30 can assume the consist 10 is fully extended and that the hopper cars 18 are a distance S1 apart; the distance of each hopper car 18 from the control car 16 can thus be calculated using the known measurements of the hopper cars 18 and the distance S1 therebetween.

The master controller 30 can control dumping of ballast based on a constant, predetermined flow rate of ballast from the ballast chute 22, for example approximately 13.5 tons per minute. However, in one embodiment a vibration sensor 27 is employed to measure a current, actual flow rate of ballast traveling through the ballast chute 22. A vibration sensor 27 is operatively mounted on or in association with each ballast chute 22 or ballast door 24 on the hopper car 18 as depicted in FIG. 5. As such, the vibration sensor 27 can measure an amount of vibration encountered by the chute 22 or door 24 as the ballast flows therethrough. The amount of vibration can be a measure of one or more of the intensity/amplitude, frequency, or other characteristic of the vibrations caused by ballast material contacting the chute 22 or door 24 as the ballast flows therethrough. The output of the vibration sensor 27 can be calibrated based on the size, type, or other characteristics of the ballast material to increase the accuracy of the flow measurements determined therefrom. For example, ballast comprising 3-inch diameter gravel will have a different vibration signature than ballast comprised of half-inch cinders.

The flow rate of the ballast from the hopper car 18 may vary in response to a variety of characteristics. These may include the type and size of ballast, the moisture content of the ballast and/or the environmental humidity, the fill level of the hopper 20, and the position of the ballast door 24 as it moves between the open and closed positions and if it is held in a partially open position, among other characteristics. Accordingly, using the vibration sensor 27, the master controller 30 can more precisely track and record the amounts of ballast delivered.

Figure 14:
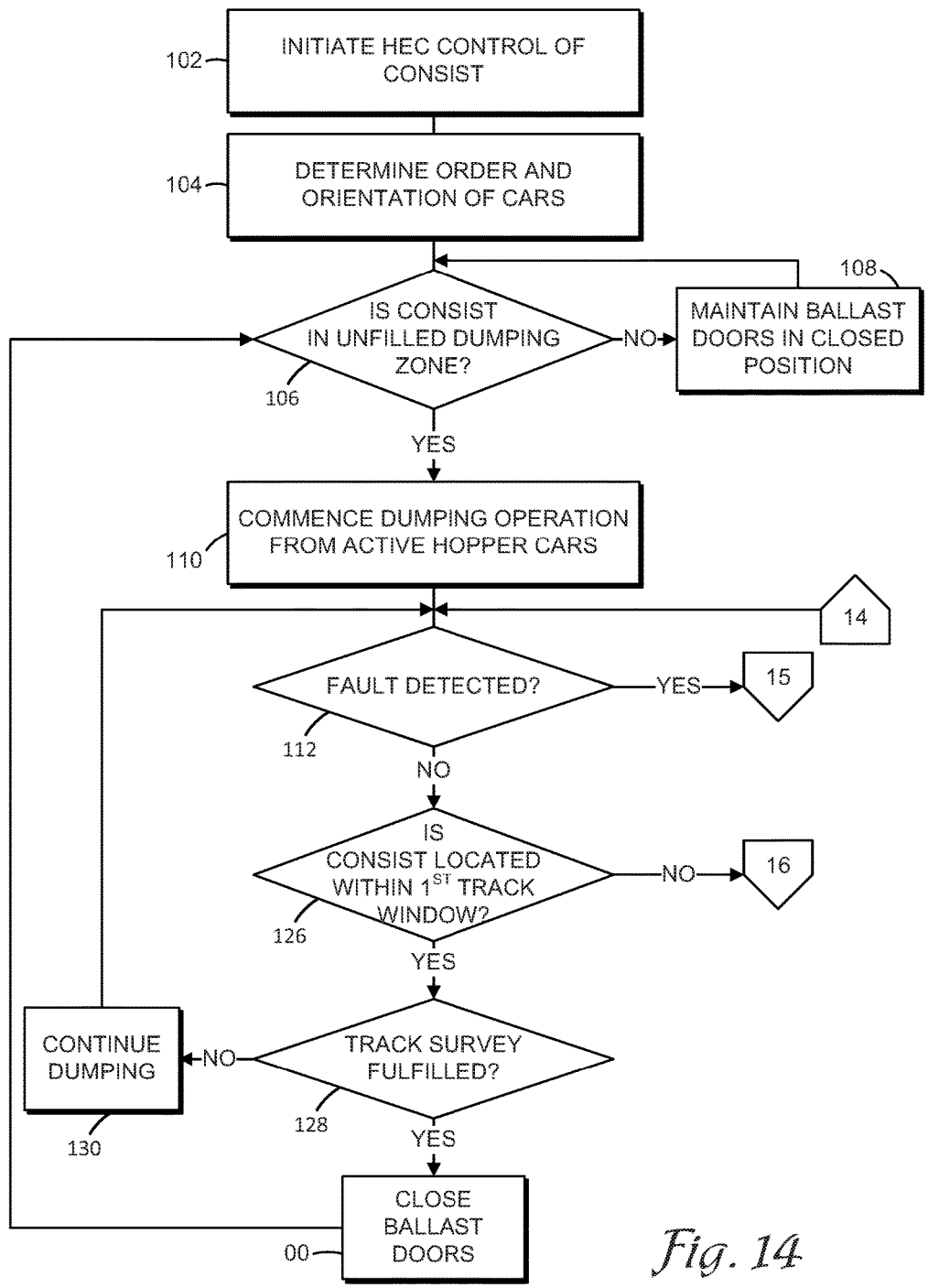
FIGS. 14-16 are a flow diagram depicting a method for controlling a ballast delivery consist in accordance with an embodiment of the invention.
Figure 15:
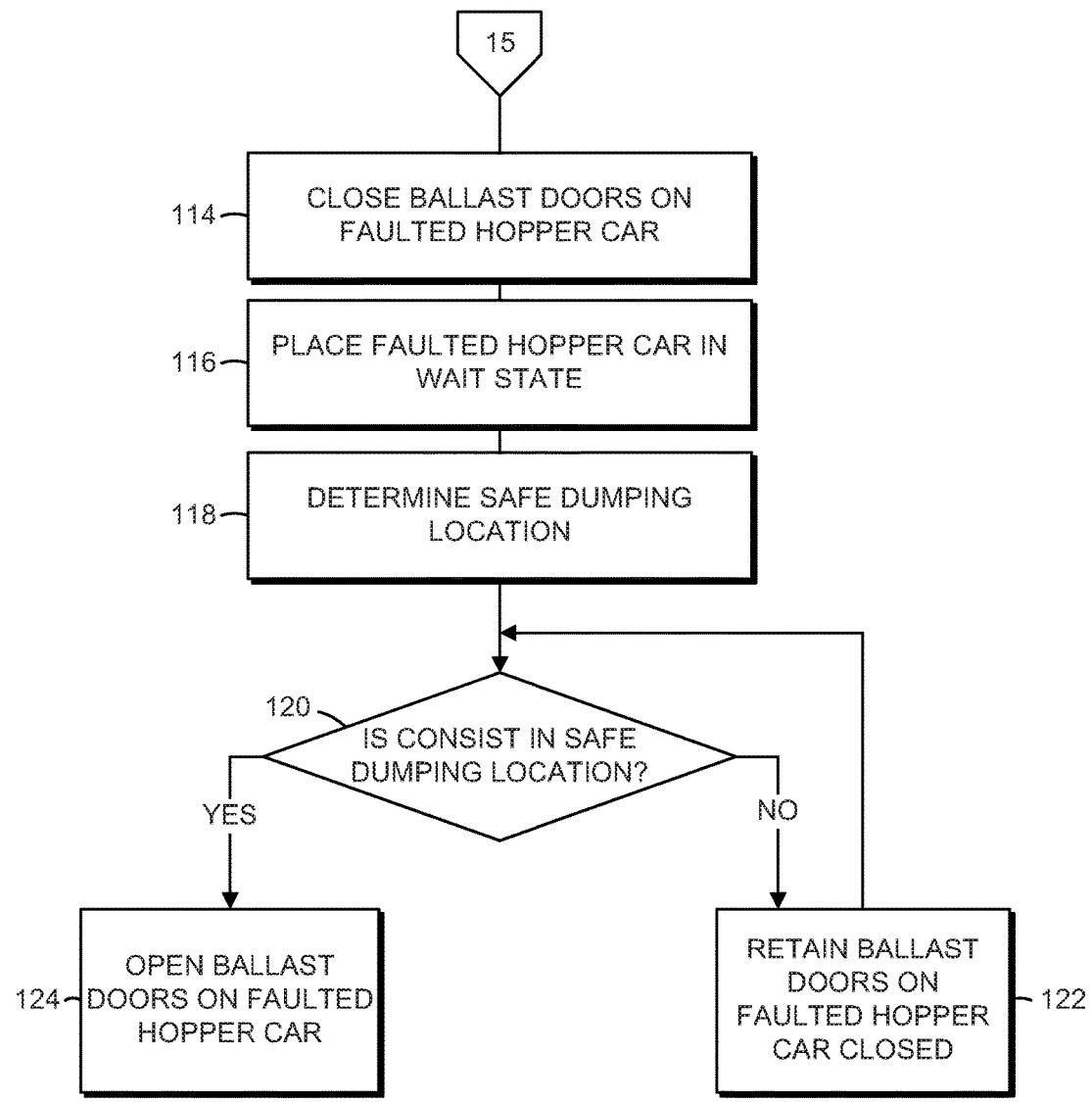
Figure 16:
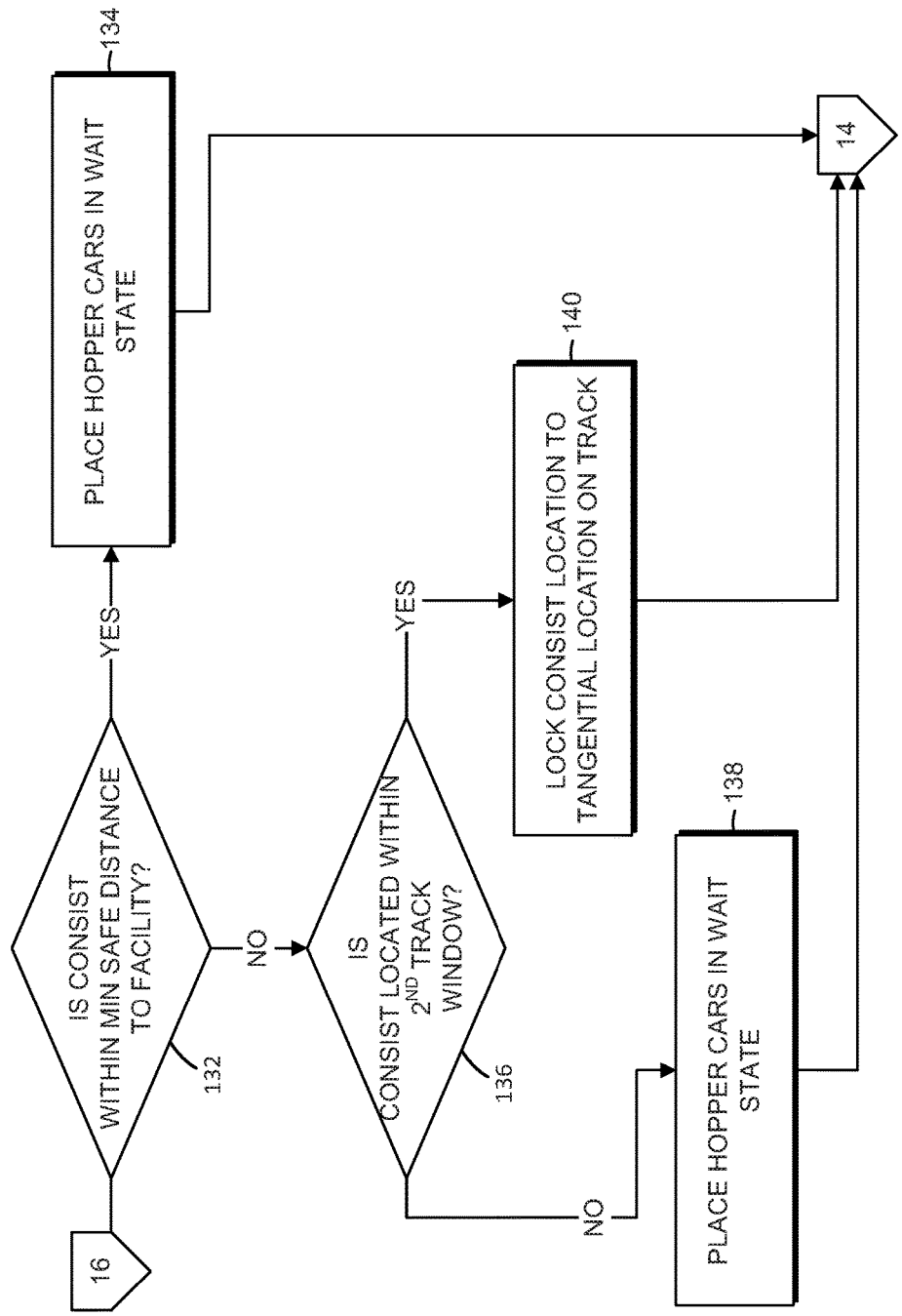

With reference now to FIGS. 14-16, operation of an autonomous ballast delivery consist, such as the consist 10, is described in accordance with an embodiment of the invention. Initially, the consist is physically assembled by coupling a desired number of hopper cars and control cars together, filling the hopper cars with the desired ballast material, and coupling the consist to one or more power units for propulsion thereof along the railway. The hopper and control cars and the power units may be assembled in any desired configuration and orientation. The master controller on one of the control cars is identified and initiated as the primary master controller for the consist as indicated at step 102. The primary master controller may be selected by an operator or may be selected automatically by the controller on each of the control cars included in the consist.

The primary or master controller queries each of the hopper cars and control cars to determine their relative location in the consist and their orientation, e.g. forward or reverse orientation, at step 104. The consist is provided with one or more track surveys identifying locations and amounts of ballast to be dumped along one or more railways. The consist can lay in wait for movement thereof to a location indicated by one of the track surveys as a dump zone. The master controller can monitor the location of the consist using the navigation system included on the control car and compare the location to the track surveys to determine whether the consist is within a dump zone, as indicated at step 106. The master controller maintains the ballast doors on the hopper cars in the closed position (step 108) until reaching an unfilled dump zone, as indicated by step 110.

The dumping operation is preferably configured to dump from the hopper cars near the front of the consist first so as to allow the rearward hopper cars to fill in missed areas as needed when the consist is placed in the wait state or when one or more of the hopper cars incurs a fault. The master controller controls dumping operation based at least on the speed of travel of the consist relative to the rate at which the ballast is dumped from the hopper cars to ensure adequate amounts of ballast are dumped to fulfill the track survey. As such, the master controller may open multiple ballast doors on multiple hopper cars to provide a dumping rate sufficient to meet the survey needs. Conversely, the master controller may close hopper doors as the consist slows down so as not to over dump in an area. When the speed of the consist falls below a set minimum, the master controller may close all doors and place the consist into the wait state until the minimum velocity is again attained. Any recorded shortages resulting during the wait state may be made up by opening ballast doors of hopper cars further rearward in the consist, if available.

During dumping operations, the master controller monitors feedback from the hopper cars to identify whether faults are detected, as depicted at step 112. Fault conditions may include unexpected readings from sensors on the hopper car, non-responsive communications with the hopper car CCU, or the like. For example, a fault may be triggered when a "door open" signal is received from the hopper car without a command to open the door. Such may be the result of an actual open door or a faulty sensor, among other possibilities.

As depicted in FIG. 15, when a fault is detected, the ballast doors of the hopper car can be closed or at least an attempt can be made to close the doors, as indicated at step 114, and the hopper car can be placed in the wait state (step 116). The master controller may determine one or more safe dumping locations based on the track survey in which the faulted hopper car will be a sufficient distance from any railroad facilities and will be within a dump zone, as indicated at step 118. The master controller monitors the location of the consist and the faulted hopper car to determine when the hopper car reaches the safe location (step 120). The ballast doors are retained in the closed state and the hopper car in the wait state until reaching the safe dumping location (step 122). Upon reaching the safe dumping location, the master controller can attempt to open the ballast doors on the faulted hopper car to empty the car while in the safe location, as depicted by step 124.

When only one ballast door in the faulted hopper car is causing the fault condition, the master controller may attempt to open just the one door or may attempt to open all doors on the faulted hopper car to fully unload the car in the safe location. Fully unloading the car in the safe location may allow the master controller to avoid additional faults from the faulted hopper car later in the dumping run. Also, opening other "known good" hopper doors may allow the master controller to bypass the faulted and potentially unresponsive door. The faulted hopper car can thus be unloaded in a location in which ballast is needed and in which risks of causing damage to railroad facilities is minimized. Additionally, unloading the faulted hopper car while on-route per the track survey avoids having to unload the car at an undesirable location such as a maintenance yard.

Returning to FIG. 14, the master controller also monitors the navigational data received from the navigation system to ensure that the perceived location of the consist, e.g. the location of the consist indicated by the navigation system, is within predetermined acceptable parameters. The master controller can monitor the navigational data and determine the perceived location based on the data from the navigation unit on the control car on which the master controller is disposed and/or based on data received from navigation units disposed on one or more other control cars and/or hopper cars.

The master controller determines whether the perceived location is within a first track window or distance to either side of the known track position (e.g. within 3 meters to either side of the track) as depicted at step 126. In another embodiment, the master controller monitors and/or calculates other values such as an RMS error value to determine whether the perceived location data is within acceptable parameters. If the perceived location is within the acceptable parameters, the consist continues dumping as required by the track survey, as indicated by steps 128 and 130.

When the perceived location is not within the first track window, the master controller determines whether the consist is within a minimum safe distance to any railroad facilities, as indicated at step 132. The minimum safe distance to railroad facilities comprises a forward distance along the track to the facility. Distances measured along or following the track, as opposed to straight-line distances between two points, may be referred to herein as track distances. In one embodiment, the minimum safe distance is about 200 meters. The minimum safe distance may be any desired distance suitable to ensure that any error in the perceived location of the consist does not overcome a safety buffer or number of safety buckets (or dynamic safety buckets) around the facility. If the master controller determines that the consist is within the minimum safe distance, e.g. less than 200 meters from the facility, then the hopper cars are placed in the wait state with their ballast doors closed, as indicated at step 134. The master controller continues to monitor the status of the consist and the location data associated therewith to determine when to return the hopper cars to the active state.

The master controller may determine the presence of the consist within the minimum safe distance to the facility on a car-by-car basis, e.g. the master controller may determine which hopper cars are within the minimum safe distance and which are not. Those hopper cars that are not within the minimum safe distance may be retained in the active state until crossing over the minimum safe distance threshold.

When the consist is not within the minimum safe distance to a facility, the master controller determines whether the navigational data indicates that the perceived location of the consist is within a second, larger track window or distance to either side of the track, as indicated at step 136. In one embodiment, the second track window is between about 3 and about 6 meters to either side of the track. If the navigational data indicates that the perceived location is not within the second track window, e.g. greater than 6 meters away from the track, then the consist is placed in the wait state and dumping is ceased until the navigation system is able to provide a more accurate location, as indicated at step 138.

If the perceived location indicated by the navigation system is within the second track window, the master controller determines an operational location on the track to be substituted for the perceived location, as indicated at step 140. The operational location is a point on the track at which a line drawn the perceived location to the track intersects the track at a right or orthogonal angle.

The monitoring of the status of the consist and its components and of the perceived location of the consist relative to the track and railroad facilities is a repetitive and ongoing process during operation of the consist. The master controller can check the status of the hopper cars and/or the location data continuously or at one or more intervals based on time, distance traveled, or the like. The intervals may be increased relative to velocity of the consist, proximity to railroad facilities, state of the hopper cars, and accuracy of the perceived location, among other characteristics.

Figure 17:
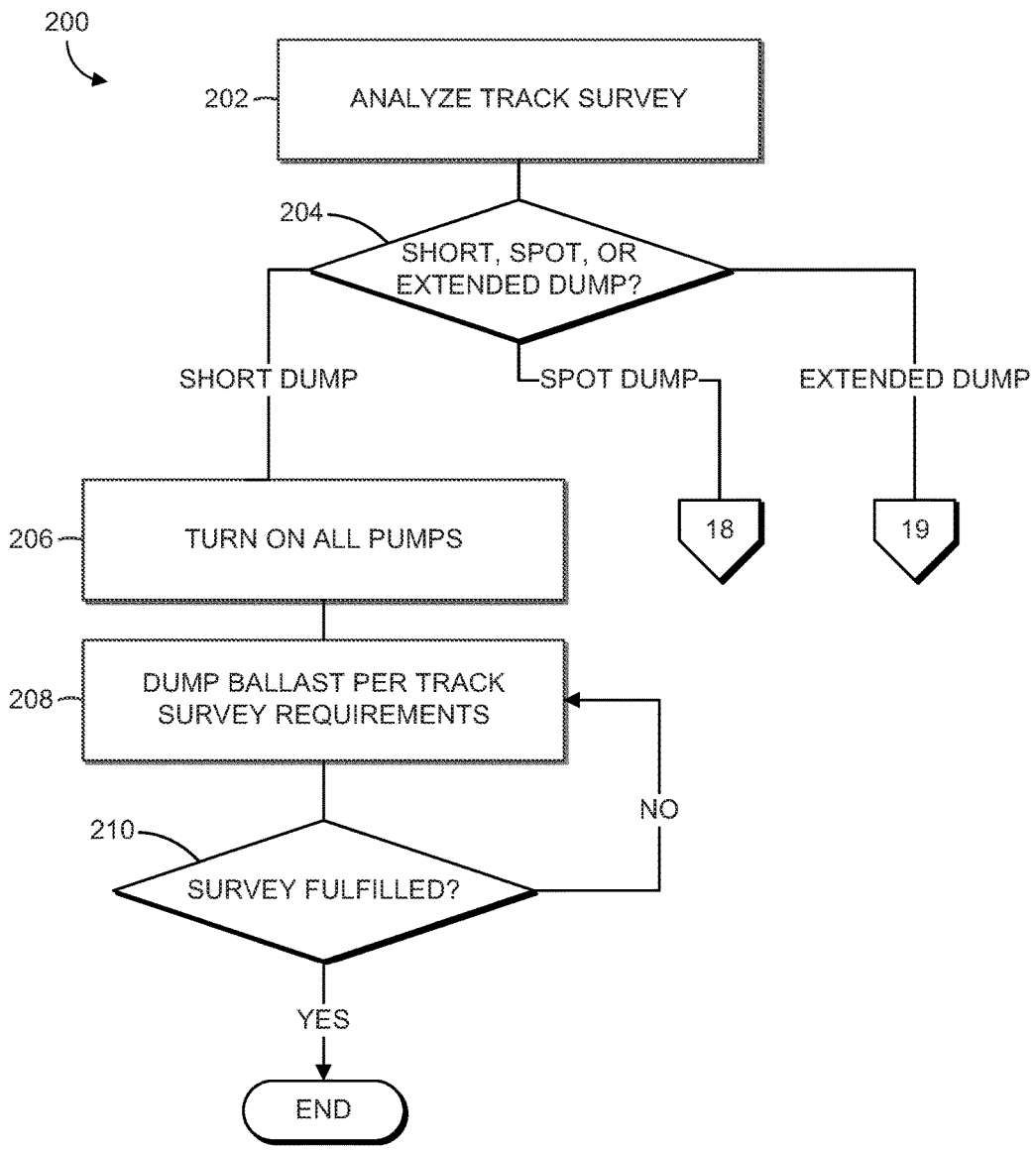
FIGS. 17-19 are flow diagrams depicting a method for controlling a power state of hopper cars within an autonomous ballast delivery consist in accordance with an embodiment of the invention.
Figure 18:
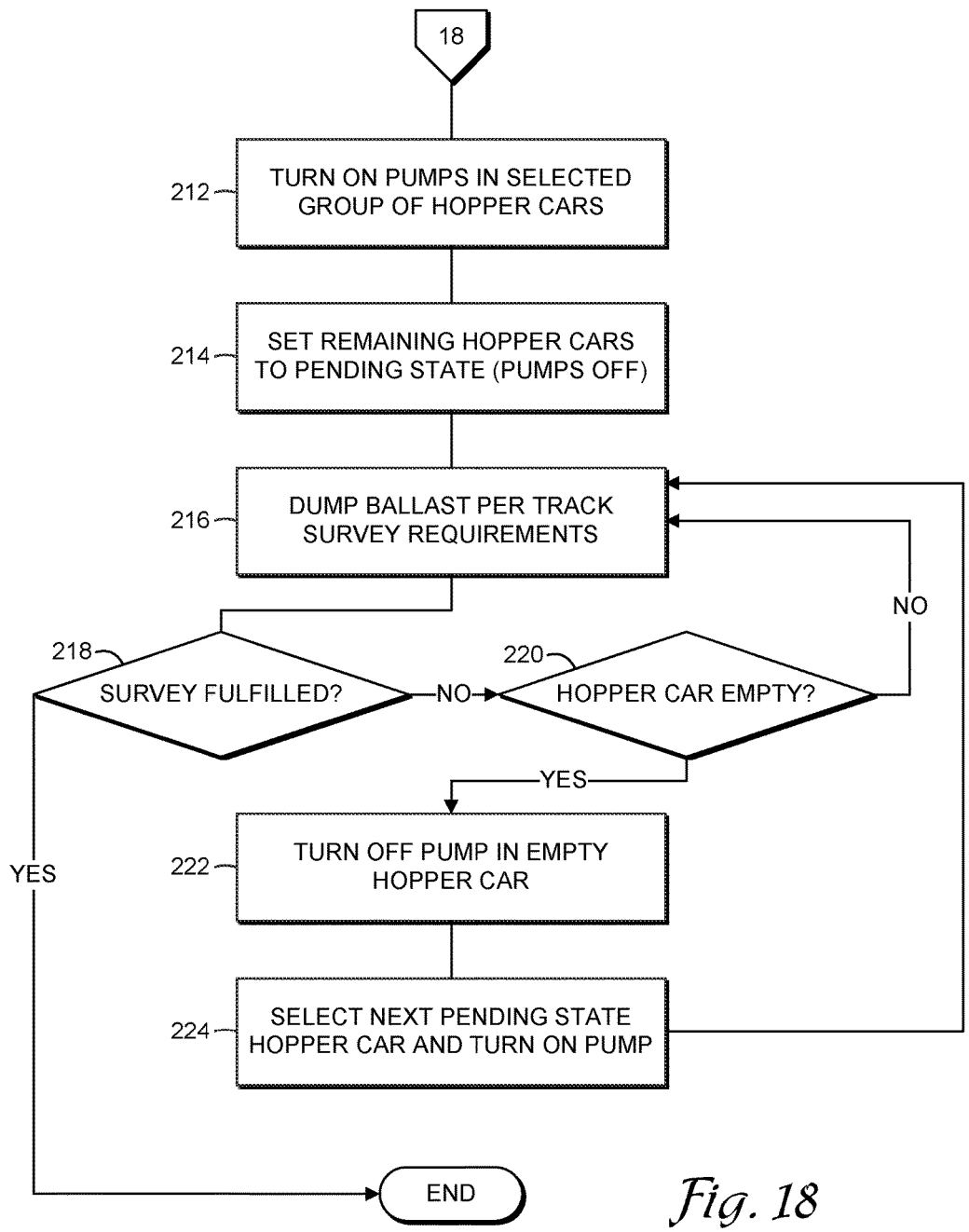
Figure 19:
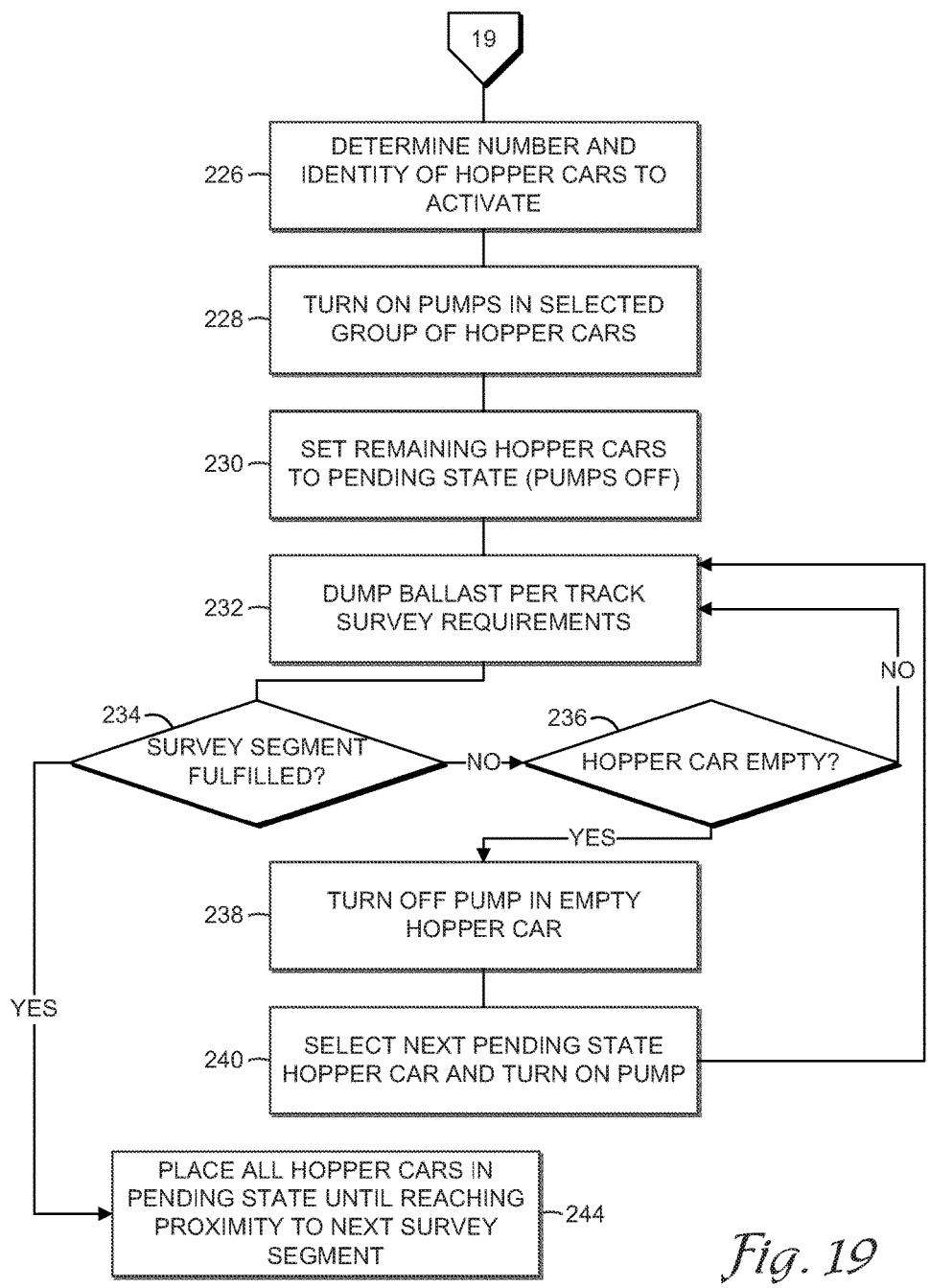

With reference now to FIGS. 17-19, the power state of each of the hopper cars in the consist can be selectively altered to conserve power, decrease equipment idle runtime, and accommodate communication limitations between the control cars, master controller, and the hopper cars, among other benefits. FIGS. 17-19 depict one exemplary power management method 200 that can be employed, however it is understood that other methods may be used. By the method 200 the power state of hydraulic pumps on each of the hopper and control cars that provide hydraulic pressure used to actuate the respective hopper doors is selectively turned on or placed in an energized or active state in which the pump is running and pressurizing the hydraulic system on the respective hopper or control car and turned off or placed in a de-energized or non-active state in which the pump is not running and not working to maintain pressure in the respective hydraulic system. Pneumatic, electric, and/or other mechanical actuators for the hopper doors might be used and similarly powered on or off. The hopper and control cars are described herein as including one pump for simplicity, however it is understood that a plurality of pumps may be employed on each of the cars. In another embodiment, the power state of electronics on the hopper and control cars can be similarly turned on or off to conserve power, among other benefits.

At step 202, the master controller analyzes the track survey(s) for regions in which the consist is to dump ballast. Based on data in the track survey, such as the locations and amounts of material to be dumped, among others, the master controller determines a dump mode which may comprise a short dump, a spot dump, and/or an extended dump, as depicted at step 204. A short dump comprises a dumping operation covering a relatively short length of track. In one embodiment, a short dump occurs over less than about ten miles of track. In a short dump operation the consist may deliver all or nearly all of its payload in a generally continuous, relatively short time frame or length of track. In such an instance, the gains provided by turning pumps on/off may be relatively small compared to the complexities required to do so. Or the speed of the dumping operation, e.g. the rate of travel of the consist, the rate of dumping, and/or quantities required, may require that all the pumps be turned on in order to meet the requirements of the track survey.

In a short dump operation, the pumps on all of the hopper/control cars are turned on or maintained in the active state, as indicated at step 206. The ballast is dumped from the cars as described above to meet the requirements of the track survey at step 208 until the track survey requirements are met at step 210. The short dump operation may or may not exhaust the payload of the consist. The remaining payload, if any, is generally insufficient to fulfill further requirements of the track survey, or a next dumping location is a sufficient distance or travel time duration away that it is treated as a separate dumping operation. Upon completion of the dumping operation, the pumps may be turned off.

A spot dump operation comprises a dumping operation in which a plurality of separate dumps are required over a longer length of track, e.g. several locations along a length of track that require ballast are separated by sections that do not require ballast. In one embodiment, a spot dump operation occurs over a length of track that is greater than ten miles in length. For a spot dump operation, pumps on a predetermined number of hopper cars are turned on (step 212) while the pumps on the remaining hopper cars are turned off or maintained in the inactive state (step 214). In one embodiment, the pumps on the first twenty hopper cars in the consist are turned on, but any number of hopper cars can be employed. The dumping operation is initiated to dump ballast per the requirements of the track survey at step 216 and continues until the requirements are fulfilled as shown at step 218.

If at step 218 the track survey requirements are not fulfilled, it is determined whether a hopper car that is dumping ballast is empty at step 220. If the hopper car is not empty, the dumping operation continues. If the hopper car is empty, then the ballast doors thereon may be closed or left open and the pump is turned off at step 222. The pump on the next hopper car in the consist following those hopper cars on which the pumps are already turned on, e.g. the twenty-first hopper car, is turned on at step 224 and the dumping operation continues.

For example, in a highly simplified instance, the pumps on the first twenty hopper cars are turned on at step 212. The dumping operation is initiated by dumping from the first hopper car (step 216). When the first hopper car is empty (step 220) the second hopper car continues the dumping operation, while the pumps on the first hopper car are turned off (step 222) and the pumps on the twenty-first hopper car are turned on. As such, twenty hopper cars may be maintained with their pumps turned on throughout the dumping operation, at least until reaching the point at which less than twenty hopper cars remain with payload. It is understood that multiple hopper cars may be and are likely dumping simultaneously and as described previously, dumping may not always be carried out in sequence from front to back of the consist, e.g. when making up for periods in which the consist is in the wait state as discussed with respect to FIG. 12.

With reference to FIG. 19, the extended dump mode comprises a dumping operation which may be spread over a longer section of track with a plurality of dumping zones which may be of different sizes, dumping rates, and/or dumping quantities, among other variables. Based on the analysis of the track survey, a number of hopper cars to activate is determined at step 226. The number of hopper cars to activate may be calculated in real-time or prior to initiating a dumping operation based on, for example, an amount of ballast required by the track survey and/or the amount of ballast to be delivered over a given distance or time period.

In one embodiment, the identities of the hopper cars to be activated may also be determined, e.g. various hopper cars along the length of the consist may be activated rather than just the first twenty. Such may be advantageous, for example, when it is desirable to dump from both the front and back portions of the consist at the same time, when different materials are being dumped from various ones of the hopper cars, or when it is beneficial to unload one portion of the consist first, among others.

The pumps in the selected hopper cars are turned on at step 228, and the pumps in the remaining hopper cars are turned off or placed in a pending state at step 230. The dumping operation continues per the track survey requirements (step 232) until the track survey requirement for the segment is fulfilled at step 234. Once fulfilled, the pumps on all of the hopper cars may be turned off (step 244), e.g. when the next dumping zone is sufficiently far away by distance and/or travel time. The pumps may again be turned on when nearing the next dumping zone and the process returned to step 228.

If the track survey segment is not yet fulfilled, but a hopper car is determined to be empty at step 236, the pump on the empty hopper car may be turned off (step 238) and the pump on a next selected hopper car turned on (step 240). The dumping operation continues at step 232.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A method for autonomously dumping material along a railway comprising:
    assembling a consist including a plurality of hopper cars containing a material to be dumped and at least one control car that includes a master controller and a navigation unit, the master controller controlling hopper doors on each of the hopper cars and including a track survey file indicating a location of a dump zone along a track in which to dump at least a portion of the material and indicating a quantity of the material to dump in the dump zone, and the navigation unit usable to determine a perceived geographic location of the control car;
    selectively placing, by the master controller, each of the hopper cars in one of an active state in which the hopper doors can be opened to dump ballast on command, a wait state in which the hopper doors are restricted from opening until the master controller determines that a fault condition is remedied, and a disengaged state in which the hopper doors are restricted from opening until the master controller receives an input from an operator, the master controller placing each of the hopper cars in the active state, wait state, and disengaged state based on an operational status of the respective hopper car and a perceived geographic location of the respective hopper car and independent of the location of the respective hopper car relative to the dump zone;
    querying each of the hopper cars by the master controller to determine the position of each hopper car in the consist;
    moving the consist along the track;
    determining that the geographic location of at least one of the hopper cars is within the dump zone and that the quantity of material is not fulfilled, the geographic location of the at least one of the hopper cars being determined based on the position of each hopper car in the consist relative to the perceived geographic location of the control car, the at least one hopper car being in the active state;
    opening the hopper door on the at least one hopper car to dump the material in the dump zone; and
    closing the hopper door when the at least one hopper car leaves the dump zone or when the quantity of material has been dumped.

2. The method of claim 1, wherein the navigation unit includes an inertial sensor.

3. The method of claim 1, further comprising:
    communicating data between the master controller and a disparately located control center using one or more of cellular communications and satellite communications.

4. The method of claim 1, wherein the control car includes a generator that provides one or more of hydraulic, pneumatic, and electric power to the hopper cars.

5. The method of claim 1, wherein the control car is a hopper car with the master controller and the navigation unit disposed thereon.

6. The method of claim 1, wherein each of the hopper cars includes a first location sensor disposed thereon and the first location sensor is used to determine the geographic location of the at least one of the hopper cars.

7. The method of claim 6, wherein each of the hopper cars includes a second location sensor disposed thereon, the first location sensor and the second location sensor being disposed at opposite ends of the respective hopper car, and wherein the first location sensor and the second location sensor are used to determine an orientation of the respective hopper car.

8. The method of claim 1, further comprising:
    determining a geographic location of a forward most one of the control car and the hopper cars in the consist;
    determining that the forward most one of the control car and the hopper cars is in the fault condition, wherein the fault condition is present when the geographic location indicates that the consist is not on the track indicated by the track survey file; and placing the consist in the wait state in which the hopper cars are operational but restricted from opening their hopper doors until the master controller determines that the fault condition is remedied and returns the consist to the active state, wherein the fault condition is remedied when the geographic location of the consist is determined to be on the track indicated by the track survey file.

9. The method of claim 1, further comprising:

comparing the perceived geographic location of one or more of the control car and one of the hopper cars to an expected geographic location of the one or more of the control car and the hopper car, the expected geographic location being located on the track;

when the perceived geographic location is within a first drift range from the expected geographic location, retaining the hopper cars in the active state, the first drift range being a predetermined allowed variance between the perceived geographic location and the expected geographic location;

when the perceived geographic location is outside the first drift range, determining that the fault condition is present and placing the hopper cars in the wait state.

10. The method of claim 9, further comprising:

determining a track distance between the expected geographic location and a railroad asset, the track distance being a distance measured along the track from the expected geographic location to the railroad asset;

when the track distance is less than a predetermined safe distance,
  determining that the perceived geographic location is within a second drift range, the second drift range being less than the first drift range, and maintaining the at least one hopper car in the active state, or
  determining that the perceived geographic location is not within the second drift range, placing the at least one hopper car in the wait state, and closing the hopper door.

11. The method of claim 10, further comprising:

increasing the safe distance when the perceived geographic location is not within the second drift range.

12. The method of claim 1, further comprising:

identifying the fault condition in a first hopper car of the plurality of hopper cars; and determining that the first hopper car is in a safe dumping location, the safe dumping location being at least a minimum safe distance from a railroad asset, the minimum safe distance being a predetermined distance measured along the track between the first hopper car and the railroad asset, and maintaining the hopper door of the first hopper car in an open position; or determining that the first hopper car is not in the safe dumping location, and closing the hopper door of the first hopper car.

13. The method of claim 12, wherein the first hopper car includes a plurality of hopper doors, and wherein maintaining the hopper door of the first hopper car in an open position further comprises:

opening one or more additional hopper doors of the plurality of hopper doors.

14. The method of claim 12, wherein the safe dumping location is within the dump zone.

15. The method of claim 1, wherein each hopper car includes a vibration sensor, and wherein the master controller tracks an amount of material dumped from each hopper car based on a flow rate indicated by a vibration detected by the respective vibration sensor.

16. The method of claim 1, further comprising:

determining that a dumping operation to be performed to fulfill requirements indicated by the track survey file extends along a length of track that is less than a predetermined length of track, and powering on a pump on each of the hopper cars in the plurality of hopper cars, the pump providing power for operation of the hopper door on the respective hopper car; or determining that the dumping operation extends beyond the predetermined length, and powering on pumps on a predetermined number of the hopper cars in the plurality, the pumps on any remaining hopper cars that are not in the predetermined number of hopper cars being one of retained in a powered off state or being powered off.

17. A method for autonomously dumping material along a railway comprising:

assembling a consist including a plurality of hopper cars containing a material to be dumped and at least one control car that includes a master controller and a navigation unit, the master controller controlling hopper doors on each of the hopper cars and including a track survey file indicating a location of a dump zone along a track in which to dump at least a portion of the material and indicating a quantity of the material to dump in the dump zone, the navigation unit usable to determine a perceived geographic location of the control car, and a first hopper car of the plurality of hopper cars including a second navigation unit usable to determine a perceived geographic location of the first hopper car, the first hopper car being spaced apart from the control car in the consist;

querying each of the hopper cars by the master controller to determine the position of each hopper car in the consist;

determining an amount of coupler slack between the each of the hopper cars based on the perceived locations of the control car and the first hopper car indicated by the navigation unit and the second navigation unit, respectively;

adjusting a calculated track location of each of the hopper cars to account for the amount of coupler slack;

moving the consist along the track;

determining that the geographic location of at least one of the hopper cars is within the dump zone and that the quantity of material is not fulfilled, the geographic location of the at least one of the hopper cars being determined based on the position of each hopper car in the consist relative to the perceived geographic location of the control car;

opening the hopper door on the at least one hopper car to dump the material in the dump zone; and closing the hopper door when the at least one hopper car leaves the dump zone or when the quantity of material has been dumped.

18. A method for autonomously dumping material along a railway comprising:

assembling a consist including a plurality of hopper cars containing a material to be dumped and at least one control car that includes a master controller and a navigation unit, the master controller controlling hopper doors on each of the hopper cars and including a track survey file indicating a location of a dump zone along a track in which to dump at least a portion of the material and indicating a quantity of the material to dump in the dump zone, and the navigation unit usable to determine a perceived geographic location of the control car;

querying each of the hopper cars by the master controller to determine the position of each hopper car in the consist;

moving the consist along the track;

adjusting a calculated track location of each of the hopper cars to account for a respective coupler slack distance between adjacent ones of the hopper cars;

determining that the calculated track location of at least one of the hopper cars is within the dump zone and that the quantity of material is not fulfilled, the calculated track location of the at least one of the hopper cars being determined based on the position of each hopper car in the consist relative to the perceived geographic location of the control car and the respective coupler slack distance;

opening the hopper door on the at least one hopper car to dump the material in the dump zone; and closing the hopper door when the at least one hopper car leaves the dump zone or when the quantity of material has been dumped.

19. The method of claim 18, wherein adjusting the calculated track location of each of the hopper cars further comprises:

determining that the consist is one or more of traveling up a grade and increasing a travel velocity, and increasing the coupler slack distance between the calculated track location of each of the hopper cars; or determining that the consist is one or more of traveling down a grade and braking, and decreasing the respective coupler slack distance between the calculated track location of each of the hopper cars.

20. A method for autonomously dumping material along a railway comprising:

comparing a perceived geographic location indicated by a navigation unit disposed on a material delivery consist comprising a plurality of hopper cars to an expected geographic location of the consist, the consist including a master controller storing a track survey depicting dump zones along a track and a geographic location of the track, and the expected geographic location of the consist being on the track;

when the perceived geographic location is within a first drift range, placing the hopper cars in an active state in which the hopper cars are operational and are enabled to open their hopper doors as instructed by the master controller, the first drift range being a predetermined allowed variance between the perceived geographic location and the expected geographic location;

when the perceived geographic location is outside the first drift range, placing the hopper cars in a wait state in which the hopper cars are operational but with hopper doors thereon closed and restricted from opening;

determining a track distance between the expected geographic location and a railroad asset, the track distance being a distance measured along the track from the expected geographic location to the railroad asset; and when the track distance is less than a predetermined safe distance, determining that the perceived geographic location is within a second drift range from the track, the second drift range being less than the first drift range, and maintaining the hopper cars in the active state, or determining that the perceived geographic location is not within the second drift range, and placing the hopper cars in the wait state.

21. The method of claim 20, further comprising:

increasing the safe distance when the perceived geographic location is not within the second drift range.

* * * * *